United States Patent
Koizumi

(10) Patent No.: US 9,740,534 B2
(45) Date of Patent: Aug. 22, 2017

(54) SYSTEM FOR CONTROLLING RESOURCES, CONTROL PATTERN GENERATION APPARATUS, CONTROL APPARATUS, METHOD FOR CONTROLLING RESOURCES AND PROGRAM

(71) Applicant: NEC Corporation, Minato-ku, Tokyo (JP)

(72) Inventor: Seiichi Koizumi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 222 days.

(21) Appl. No.: 14/761,800

(22) PCT Filed: Jan. 31, 2014

(86) PCT No.: PCT/JP2014/052239
§ 371 (c)(1),
(2) Date: Jul. 17, 2015

(87) PCT Pub. No.: WO2014/119719
PCT Pub. Date: Aug. 7, 2014

(65) Prior Publication Data
US 2015/0363240 A1    Dec. 17, 2015

(30) Foreign Application Priority Data

Feb. 1, 2013  (JP) ................... 2013-018202

(51) Int. Cl.
*G06F 9/50*   (2006.01)
*G06F 11/34*  (2006.01)
(Continued)

(52) U.S. Cl.
CPC ........ *G06F 9/5077* (2013.01); *G06F 9/45558* (2013.01); *G06F 9/5061* (2013.01);
(Continued)

(58) Field of Classification Search
CPC .. G06F 9/5077; G06F 9/45558; G06F 9/5061; G06F 2009/4557;
(Continued)

(56) References Cited

U.S. PATENT DOCUMENTS 8,087,025 B1 * 12/2011 Graupner ................ G06F 9/505
                                                  718/104
8,104,038 B1 *  1/2012 Graupner .................. G06F 8/63
                                                  718/104
(Continued)

FOREIGN PATENT DOCUMENTS

JP       2007-028035 A     2/2007
JP       2007-249445 A     9/2007
(Continued)

OTHER PUBLICATIONS

International Search Report for PCT Application No. PCT/JP2014/052239, mailed on Mar. 18, 2014.
(Continued)

*Primary Examiner* — Benjamin Wu

(57) ABSTRACT

A system for controlling the resources includes a control pattern generation unit for generating a plurality of control patterns from a virtual system model, produced by modeling the behaviors of a network element and a server of a virtual system operating on a virtual datacenter, and from a resource allocation change policy stipulating a policy or policies of change of allocation of resources to the virtual systems. The control patterns prove candidates for control commands to network resources and server resources of the virtual systems. The system for controlling the resources also includes a control unit for carrying out prediction of a service level, using the control patterns, selecting such control pattern that satisfies the service level of the virtual systems and that also satisfies a preset standard or reference for selection, from (Continued)

among the control patterns, with the use of the result of prediction, and putting the control pattern selected to use.

20 Claims, 26 Drawing Sheets

(51) Int. Cl.
*G06F 9/455* (2006.01)
*H04L 12/911* (2013.01)
*G06Q 50/10* (2012.01)

(52) U.S. Cl.
CPC ...... *G06F 11/3447* (2013.01); *G06F 11/3457* (2013.01); *H04L 47/823* (2013.01); *G06F 2009/4557* (2013.01); *G06F 2009/45595* (2013.01); *G06Q 50/10* (2013.01)

(58) Field of Classification Search
CPC ....... G06F 2009/45595; G06F 11/3447; G06F 11/3457; H04L 47/823
See application file for complete search history.

(56) References Cited

U.S. PATENT DOCUMENTS

| | | | | |
|---|---|---|---|---|
| 8,117,613 B2* | 2/2012 | Uyeda | ............... | G06F 9/4856 718/1 |
| 8,555,287 B2* | 10/2013 | Ding | ............... | G06F 9/505 718/102 |
| 8,627,309 B2* | 1/2014 | Scheidel | ............... | G06F 8/61 717/172 |
| 8,645,529 B2* | 2/2014 | Doddavula | ........... | G06F 9/5072 709/223 |
| 8,756,307 B1* | 6/2014 | Chen | ............... | G06F 11/3414 709/223 |
| 8,806,487 B2* | 8/2014 | Zhang | ............... | G06F 9/5083 718/1 |
| 2007/0006218 A1* | 1/2007 | Vinberg | ............... | G06F 8/61 717/174 |
| 2007/0220149 A1* | 9/2007 | Kawashima | ........ | H04L 67/1008 709/226 |
| 2007/0271560 A1* | 11/2007 | Wahlert | ............... | G06F 8/61 718/1 |
| 2008/0034093 A1* | 2/2008 | Sutou | ............... | G06F 9/5083 709/226 |
| 2008/0163194 A1* | 7/2008 | Dias | ............... | G06F 9/5077 717/174 |
| 2008/0172673 A1* | 7/2008 | Naik | ............... | G06F 9/505 718/104 |
| 2008/0221941 A1* | 9/2008 | Cherkasova | ............ | G06F 9/505 718/106 |
| 2008/0270595 A1* | 10/2008 | Rolia | ................. | G06F 11/3414 709/224 |
| 2008/0271039 A1* | 10/2008 | Rolia | .................... | G06Q 10/06 718/105 |
| 2010/0050172 A1* | 2/2010 | Ferris | .................... | G06F 9/5072 718/1 |
| 2010/0199267 A1* | 8/2010 | Rolia | .................... | G06Q 10/06 717/135 |
| 2010/0281478 A1* | 11/2010 | Sauls | .................... | G06F 9/5077 718/1 |
| 2011/0214124 A1* | 9/2011 | Ferris | ....................... | G06F 8/63 718/1 |
| 2011/0307901 A1* | 12/2011 | Blanding | ............. | G06F 9/5061 718/104 |
| 2012/0060167 A1* | 3/2012 | Salsburg | .................. | G06F 9/50 718/104 |
| 2012/0284380 A1* | 11/2012 | Anderson, III | ......... | H04L 29/06 709/223 |
| 2012/0284408 A1* | 11/2012 | Dutta | .................... | G06F 9/5066 709/226 |
| 2013/0138812 A1* | 5/2013 | Assuncao | ................ | G06F 9/50 709/226 |
| 2013/0185433 A1* | 7/2013 | Zhu | ....................... | H04L 67/303 709/226 |
| 2014/0019965 A1* | 1/2014 | Neuse | ................ | G06F 9/45533 718/1 |
| 2014/0095693 A1* | 4/2014 | Apte | .................. | H04L 67/1008 709/224 |

FOREIGN PATENT DOCUMENTS

| | | |
|---|---|---|
| JP | 2007-305101 A | 11/2007 |
| JP | 2008-033852 A | 2/2008 |
| JP | 2008-203934 A | 9/2008 |
| WO | 2009/144822 A1 | 12/2009 |

OTHER PUBLICATIONS

Nick McKeown and seven others, "OpenFlow: Enabling Innovation in Campus Networks", Mar. 14, 2008.
"OpenFlow Switch Specification" Version 1.3.1 (Wire Protocol 0x04), Sep. 6, 2012.

* cited by examiner

FIG. 7

| REQUEST ID | vdc ID | SERVER/ APPLIANCE ID | SERVER/ APPLIANCE NAME | PROCESSING TIME(SEC) | AVERAGE NUMBER OF CONCURRENT REQUESTS | TIME STAMP |
|---|---|---|---|---|---|---|
| 1 | vdc1 | vdc1_web1 | Web1 | 10.123 | 4 | 2012/09/27 10:19:12 |
| 2 | vdc1 | vdc1_fw1 | FW1 | 4.456 | 3 | 2012/09/27 10:19:31 |
| ... | ... | ... | ... | ... | ... | ... |

FIG. 9

| vdcID | vdc CONSTRUCTION |
|---|---|
| vdc1 | ```xml
<?xml version="1.0"?>
<net systemID="vdc1_sys1">
<!--##### places #####-->
  <place id="p00"/>
  <place id="p01"/>
  <place id="p02"/>
  <place id="p04"/>
  <place id="p05"/>
  <place id="p06"/>
  <place id="p07"/>
<!--##### transitions #####-->
  <transition id="t00" type="StartPoint" name="StartPoint1"/>
  <transition id="t01" type="FW" name="FW1">
    <resource cpu=2 ram=2/>
  </transition>
  <transition id="t03" type="LoadBalancer" name="LB1">
    <resource cpu=1 ram=1/>
  </transition>
  <transition id="t05" type="WebServer" name="Web1">
    <resource cpu=1 ram=1/>
  </transition>
  <transition id="t06" type="WebServer" name="Web2">
    <resource cpu=1 ram=1/>
  </transition>
  <transition id="t07" type="WebServer" name="Web3">
    <resource cpu=1 ram=1/>
  </transition>
  <transition id="t08" type="ApplicationServer" name="App1">
    <resource cpu=1 ram=1/>
  </transition>
  <transition id="t09" type="RDB" name="DB1">
    <resource cpu=1 ram=2/>
  </transition>
<!--##### arcs #####-->
<!-- p00_t00_p01 -->
  <arc id="in_p00_t00" source="p00" target="t00"/>
  <arc id="out_t00_p01" source="t00" target="p01"/>
<!-- p01_t01_p02 -->
  <arc id="in_p01_t01" source="p01" target="t01"/>
  <arc id="out_t01_p02" source="t01" target="p02" >
<!-- p02_t03_p04 -->
  <arc id="in_p02_t03" source="p02" target="t03"/>
  <arc id="out_t03_p04" source="t03" target="p04"/>
<switch>
<!-- p04_t05_p05 -->
  <arc id="in_p04_t05" source="p04" target="t05" >
    <case value=10/>
  </arc>
  <arc id="out_t05_p05" source="t05" target="p05"/>
<!-- p04_t06_p05 -->
  <arc id="in_p04_t06" source="p04" target="t06">
    <case value=11/>
  </arc>
  <arc id="out_t06_p05" source="t06" target="p05"/>
<!-- p04_t07_p05 -->
  <arc id="in_p04_t07" source="p04" target="t07">
    <case value=12/>
  </arc>
  <arc id="out_t07_p05" source="t07" target="p05"/>
</switch>
<!-- p05_p06 -->
  <arc id="in_p05_t08" source="p05" target="t08"/>
  <arc id="out_t08_p06" source="t08" target="p06"/>
<!-- p06_p07 -->
  <arc id="in_p06_t09" source="p06" target="t09"/>
  <arc id="out_t09_p07" source="t09" target="p07"/>
</net>
``` |
| ... | ... |

LIST OF VIRTUAL SERVERS AND APPLIANCES MAKING UP THE VIRTUAL SYSTEM

CONSTRUCTION INFORMATION SHOWING CONCERTING RELATIONSHIP BETWEEN VIRTUAL SERVERS AND APPLIANCES

FIG. 10

| PREDICTION EQUATION ID | vdc ID | SERVER/ APPLIANCE ID | SERVER/ APPLIANCE NAME | EQUATIONS OF PREDICTION |
|---|---|---|---|---|
| 1 | vdc1 | vdc1_fw1 | FW1 | $(\alpha 1 * X\_p01)/(\gamma 1 * cpu1 + \delta 1 * ram1) + \beta 1$ |
| 2 | vdc1 | vdc1_web1 | Web1 | $\alpha 3 * X\_p04/(\gamma 3 * cpu3 + \delta 3 * ram3) + \beta 3$ |
| ... | ... | ... | ... | ... |

FIG. 11

| vdc MODEL ID | vdcID | vdc CONSTRUCTION |
|---|---|---|
| model1 | vdc1 | ```xml
<?xml version="1.0"?>
<net systemID="vdc1_sys1">
<!--##### places #####-->
  <place id="p00"/>
  <place id="p01"/>
  <place id="p02"/>
  <place id="p04"/>
  <place id="p05"/>
  <place id="p06"/>
  <place id="p07"/>
<!--##### transitions #####-->
  <transition id="t00" type="StartPoint" name="StartPoint">
  <transition id="t01" type="FW" name="FW1">
    <resource cpu=2 ram=2/>
    <processingTime> (α1*X_p01)/(γ1*cpu1+δ1*ram1)+β1 </processingTime>
  </transition>
  <transition id="t03" type="LoadBalancer" name="LB1">
    <resource cpu=1 ram=1/>
    <processingTime> (α2*X_p03)/(γ2*cpu2+δ2*ram2)+β2 </processingTime>
  </transition>
  <transition id="t05" type="WebServer" name="Web1">
    <resource cpu=1 ram=1/>
    <processingTime> (α3*X_p04)/(γ3*cpu3+δ3*ram3)+β3 </processingTime>
  </transition>
  <transition id="t06" type="WebServer" name="Web2">
    <resource cpu=1 ram=1/>
    <processingTime> (α4*X_p04)/(γ4*cpu4+δ4*ram4)+β4 </processingTime>
  </transition>
  <transition id="t07" type="WebServer" name="Web3">
    <resource cpu=1 ram=1/>
    <processingTime> (α5*X_p04)/(γ5*cpu5+δ5*ram5)+β5 </processingTime>
  </transition>
  <transition id="t08" type="ApplicationServer" name="App1">
    <resource cpu=1 ram=1/>
    <processingTime> (α6*X_p05)/(γ6*cpu6+δ6*ram6)+β6 </processingTime>
  </transition>
  <transition id="t09" type="RDB" name="DB1">
    <resource cpu=1 ram=2/>
    <processingTime> (α7*X_p06)/(γ7*cpu7+δ7*ram7)+β7 </processingTime>
  </transition>
<!--##### arcs #####-->
<!-- p00_t00_p01 -->
  <arc id="in_p00_t00" source="p00" target="t00"/>
  <arc id="out_t00_p01" source="t00" target="p01"/>
<!-- p01_t01_p02 -->
  <arc id="in_p01_t01" source="p01" target="t01"/>
  <arc id="out_t01_p02" source="t01" target="p02" >
<!-- p02_t03_p04 -->
  <arc id="in_p02_t03" source="p02" target="t03"/>
  <arc id="out_t03_p04" source="t03" target="p04"/>
  <switch>
<!-- p04_t05_p05 -->
    <arc id="in_p04_t05" source="p04" target="t05" >
      <case value=10/>
    </arc>
    <arc id="out_t05_p05" source="t05" target="p05"/>
<!-- p04_t06_p05 -->
    <arc id="in_p04_t06" source="p04" target="t06">
      <case value=11/>
    </arc>
    <arc id="out_t06_p05" source="t06" target="p05"/>
<!-- p04_t07_p05 -->
    <arc id="in_p04_t07" source="p04" target="t07">
      <case value=12/>
    </arc>
    <arc id="out_t07_p05" source="t07" target="p05"/>
  </switch>
<!-- p05_p06 -->
  <arc id="in_p05_t08" source="p05" target="t08"/>
  <arc id="out_t08_p06" source="t08" target="p06"/>
<!-- p06_p07 -->
  <arc id="in_p06_t09" source="p06" target="t09"/>
  <arc id="out_t09_p07" source="t09" target="p07"/>
</net>
``` |
| ... | ... | ... |

(ADD EQUATION OF PREDICTION FOR EACH VIRTUAL SERVER/APPLIANCE — annotation pointing to the `<processingTime>` line of transition t01)

FIG. 12
[RESOURCE ALLOCATION CHANGE POLICY A: CHANGING OVER THE LOAD BALANCERS]
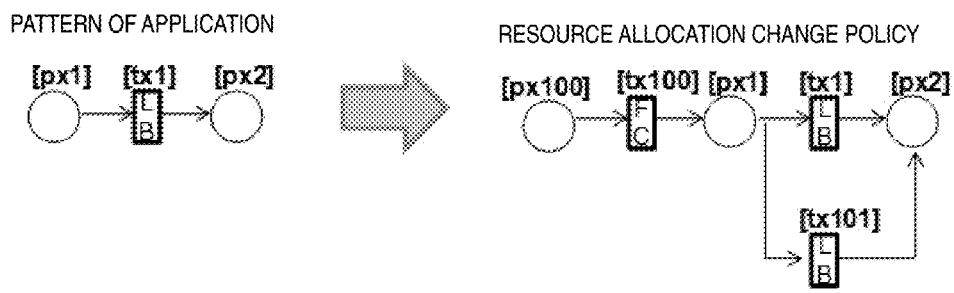
[RESOURCE ALLOCATION CHANGE POLICY B: ADDING SERVER RESOURCES FOR DB]
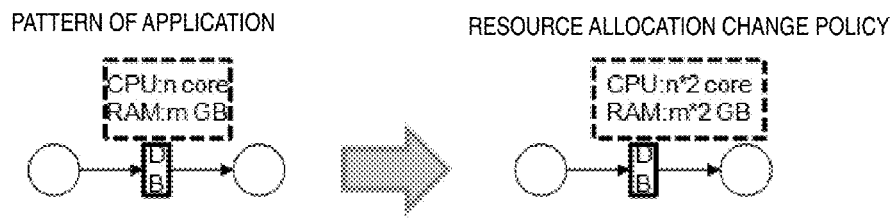
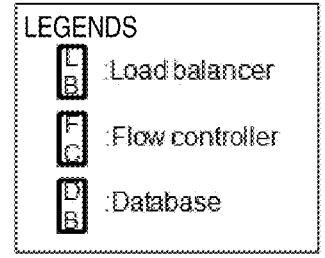

FIG. 13

| POLICY ID | POLICY NAME | QUANTITIES OF CONSUMPTION OF RESOURCES | PATTERNS OF APPLICATION | RESOURCE ALLOCATION CHANGE POLICIES |
|---|---|---|---|---|
| Policy1 | LB_switch | 4 | `<!--##### places #####-->`<br>`<place id="px1"/>`<br>`<place id="px2"/>`<br>`<!--##### transitions #####-->`<br>`<transition id="tx1" type="LoadBalancer">`<br>`<resource cpu=P ram=Q/>`<br>`</transition>`<br>`<!--##### arcs #####-->`<br>`<arc source="px1" target="tx1"/>`<br>`<arc source="tx1" target="px2"/>` | `<!--##### places #####-->`<br>`<place id="px100"/>`<br>`<place id="px1"/>`<br>`<place id="px2"/>`<br>`<!--##### transitions #####-->`<br>`<transition id="tx100" type="FlowControl">`<br>`<condition thread=50/>`<br>`</transition>`<br>`<transition id="tx1" type="LoadBalancer">`<br>`</transition>`<br>`<transition id="tx101" type="LoadBalancer">`<br>`<resource cpu=P ram=Qx2/>`<br>`</transition>`<br>`<!--##### arcs #####-->`<br>`<arc source="px1" target="tx100"/>`<br>`<arc source="tx100" target="px1"/>`<br>`<switch>`<br>`<case value=1/>`<br>`<arc source="px1" target="tx1"/>`<br>`<arc source="tx1" target="px2"/>`<br>`<case value=2/>`<br>`<arc source="px1" target="tx101"/>`<br>`<arc source="tx101" target="px2"/>`<br>`</switch>` |
| Policy2 | RDB_enhance | 2 | `<!--##### places #####-->`<br>`<place id="px1"/>`<br>`<place id="px2"/>`<br>`<!--##### transitions #####-->`<br>`<transition id="tx1" type="RDB">`<br>`<resource cpu=P ram=Q/>`<br>`</transition>`<br>`<!--##### arcs #####-->` | `<!--##### transitions #####-->`<br>`<transition id="tx1" type="RDB">`<br>`<resource cpu=Px2 ram=Qx2/>`<br>`</transition>` |
| ... | | | | |

FIG. 14

| CONTROL PATTERN ID | vdcID | POLICY OF APPLICATION | QUANTITY OF CONSUMPTION OF RESOURCES | CONTROL PATTERNS |
|---|---|---|---|---|
| pattern1 | vdc1 | LB_switch | 4 | (see below) |

```
<?xml version="1.0"?>
<net systemID="vdc1_sys1" control_patternID="LB_1">
<!--##### resource consumption #####-->
<resources value=4>
<!--##### places #####-->
  <place id="p00"/>
  <place id="p01"/>
  <place id="p02"/>
  <place id="p03"/>
  <place id="p04"/>
  <place id="p05"/>
  <place id="p06"/>
  <place id="p07"/>
<!--##### transitions #####-->
<transition id="t00" type="StartPoint" name="StartPoint1"/>
<transition id="t01" type="FW" name="FW1">
  <resource cpu=2 ram=2/>
  <processingTime> α1*X_p01+β1 </processingTime>
</transition>
<transition id="t02" type="FlowControl" name="FlowControl1">
  <condition thread=50/>
  <processingTime> α100*X_p01+β100 </processingTime>
</transition>
<transition id="t03" type="LoadBalancer" name="LB1">
  <resource cpu=1 ram=1/>
  <processingTime> α2*X_p03+β2</processingTime>
</transition>
<transition id="t04" type="LoadBalancer" name="LB2">
  <resource cpu=2 ram=4/>
  <processingTime> α101*X_p03+β101</processingTime>
</transition>
<transition id="t05" type="WebServer" name="Web1">
  <resource cpu=1 ram=1/>
  <processingTime> α3*X_p04+β3</processingTime>
</transition>
<transition id="t06" type="WebServer" name="Web2">
  <resource cpu=1 ram=1/>
  <processingTime> α4*X_p04+β4</processingTime>
</transition>
<transition id="t07" type="WebServer" name="Web3">
  <resource cpu=1 ram=1/>
  <processingTime> α5*X_p04+β5</processingTime>
</transition>
<transition id="t08" type="ApplicationServer" name="App1">
  <resource cpu=1 ram=1/>
  <processingTime> α6*X_p05+β6</processingTime>
</transition>
<transition id="t09" type="RDB" name="DB1">
  <resource cpu=1 ram=2/>
  <processingTime> α7*X_p06+β7</processingTime>
</transition>
<!--##### arcs #####-->
<!-- p00_t00_p01 -->
<arc id="in_p00_t00" source="p00" target="t00"/>
<arc id="out_t00_p01" source="t00" target="p01"/>
<!-- p01_t01_p02 -->
<arc id="in_p01_t01" source="p01" target="t01"/>
<arc id="out_t01_p02" source="t01" target="p02" >
<!-- p02_t02_p03 -->
<arc id="in_p02_t02" source="p02" target="t02"/>
<arc id="out_t02_p03" source="t02" target="p03"/>
<switch>
  <!-- p03_t03_p04 -->
  <arc id="in_p03_t03" source="p03" target="t03">
    <case value=1/>
  </arc>
```

APPLY RESOURCE ALLOCATION CHANGE POLICIES TO ADD APPLIANCES, CHANGE QUANTITIES OF RESOURCES AND CHANGE CONSTRUCTION

FIG. 16

| pattern2 | vdc1 | LB_switch, RDB_enhance | 6 | |
|---|---|---|---|---|

```xml
<?xml version="1.0"?>
<net systemID="vdc1_sys1" control_patternID="LB_1">
<!--##### resource consumption #####-->
<resources value=4>
<!--##### places #####-->
  <place id="p00"/>
  <place id="p01"/>
  <place id="p02"/>
  <place id="p03"/>
  <place id="p04"/>
  <place id="p05"/>
  <place id="p06"/>
  <place id="p07"/>
<!--##### transitions #####-->
  <transition id="t00" type="StartPoint" name="StartPoint1"/>
  <transition id="t01" type="FW" name="FW1">
   <resource cpu=2 ram=2/>
   <processingTime> α1*X_p01+β1 </processingTime>
  </transition>
  <transition id="t02" type="FlowControl" name="FlowControl1">
   <condition thread=50/>
   <processingTime> α100*X_p01+β100 </processingTime>
  </transition>
  <transition id="t03" type="LoadBalancer" name="LB1">
   <resource cpu=1 ram=1/>
   <processingTime> α2*X_p03+β2</processingTime>
  </transition>
  <transition id="t04" type="LoadBalancer" name="LB2">
   <resource cpu=2 ram=4/>
   <processingTime> α101*X_p03+β101</processingTime>
  </transition>
  <transition id="t05" type="WebServer" name="Web1">
   <resource cpu=1 ram=1/>
   <processingTime> α3*X_p04+β3</processingTime>
  </transition>
  <transition id="t06" type="WebServer" name="Web2">
   <resource cpu=1 ram=1/>
   <processingTime> α4*X_p04+β4</processingTime>
  </transition>
  <transition id="t07" type="WebServer" name="Web3">
   <resource cpu=1 ram=1/>
   <processingTime> α5*X_p04+β5</processingTime>
  </transition>
  <transition id="t08" type="ApplicationServer" name="App1">
   <resource cpu=1 ram=1/>
   <processingTime> α6*X_p05+β6</processingTime>
  </transition>
  <transition id="t09" type="RDB" name="DB1">
   <resource cpu=1 ram=2/>
   <processingTime> α7*X_p06+β7</processingTime>
  </transition>
```

FIG. 17

```xml
<!--##### arcs #####-->
<!-- p00_t00_p01 -->
<arc id="in_p00_t00" source="p00" target="t00"/>
<arc id="out_t00_p01" source="t00" target="p01"/>
<!-- p01_t01_p02 -->
<arc id="in_p01_t01" source="p01" target="t01"/>
<arc id="out_t01_p02" source="t01" target="p02" >
<!-- p02_t02_p03 -->
<arc id="in_p02_t02" source="p02" target="t02"/>
<arc id="out_t02_p03" source="t02" target="p03"/>
<switch>
  <!-- p03_t03_p04 -->
  <arc id="in_p03_t03" source="p03" target="t03">
    <case value=1/>
  </arc>
  <arc id="out_t03_p04" source="t03" target="p04"/>
  <!-- p03_t04_p04 -->
  <arc id="in_p03_t04" source="p03" target="t04" >
    <case value=2/>
  </arc>
  <arc id="out_t04_p04" source="t04" target="p04" />
</switch>
<switch>
  <!-- p04_t05_p05 -->
  <arc id="in_p04_t05" source="p04" target="t05" >
    <case value=10/>
  </arc>
  <arc id="out_t05_p05" source="t05" target="p05"/>
  <!-- p04_t06_p05 -->
  <arc id="in_p04_t06" source="p04" target="t06">
    <case value=11/>
  </arc>
  <arc id="out_t06_p05" source="t06" target="p05"/>
  <!-- p04_t07_p05 -->
  <arc id="in_p04_t07" source="p04" target="t07">
    <case value=12/>
  </arc>
  <arc id="out_t07_p05" source="t07" target="p05"/>
</switch>
<!-- p05_p06 -->
<arc id="in_p05_t08" source="p05" target="t08"/>
<arc id="out_t08_p06" source="t08" target="p06"/>
<!-- p06_p07 -->
<arc id="in_p06_t09" source="p06" target="t09"/>
<arc id="out_t09_p07" source="t09" target="p07"/>
</net>
```

| ... | ... | ... | ... | ... |

FIG. 19
[RESOURCE ALLOCATION CHANGE POLICY C (SCALE OUT- SCALE IN CONTROL): ADDITION OF CLONE WEB SERVER]
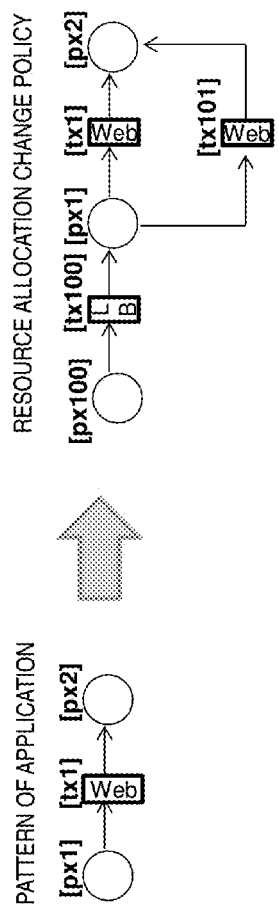
[RESOURCE ALLOCATION CHANGE POLICY D (SCALE UP- SCALE DOWN CONTROL): ADDITION OF SERVER RESOURCES FOR DB]
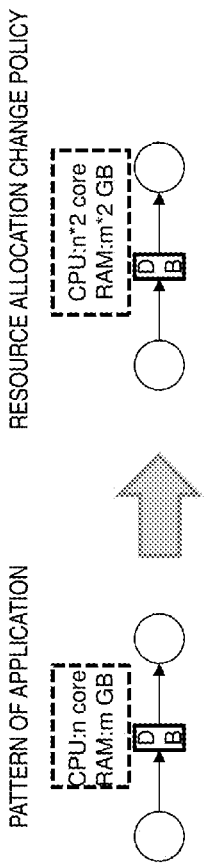
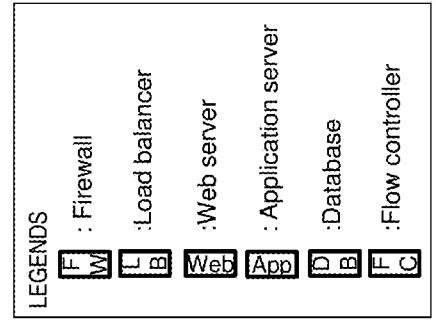

FIG. 20
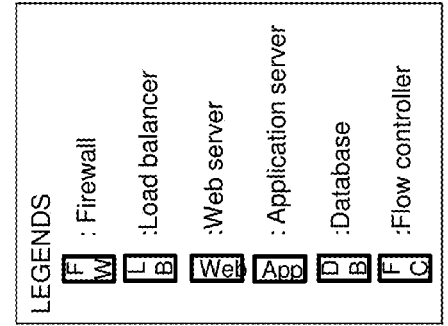
[RESOURCE ALLOCATION CHANGE POLICY E (PATH CONTROL): CHANGING OVER LOAD BALANCERS]
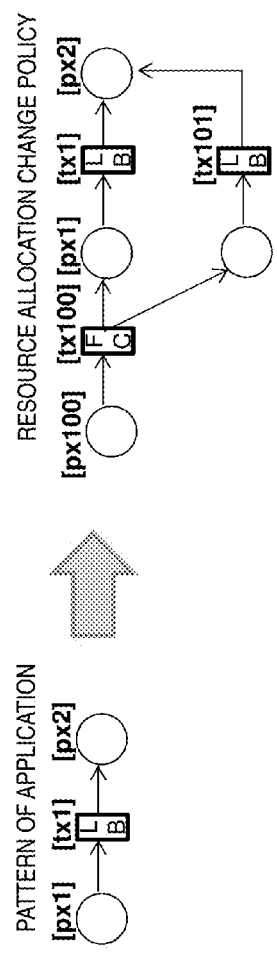
[RESOURCE ALLOCATION CHANGE POLICY F (FLOW CONTROL): BANDWIDTH LIMITATION]
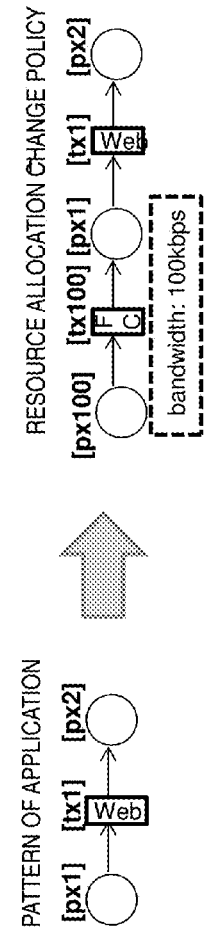

FIG. 21

| SIMULATION RESULT ID | CONTROL PATTERN ID | QUANTITIES OF CONSUMPTION OF RESOURCES | AVERAGE PROCESSING TIME(SEC) | vdcID |
|---|---|---|---|---|
| result1 | pattern1 | 2 | 42.5 | vdc1 |
| result2 | pattern2 | 6 | 36.2 | vdc1 |
| ... | ... | ... | ... | ... |

FIG. 22

| SERVICE LEVEL ID | vdcID | SERVICE LEVELS (SEC) |
|---|---|---|
| 1 | Vdc1 | 50 |
| ... | ... | ... |

FIG. 23

| EVALUATED ID | CONTROL PATTERN ID | TIME OF SELECTION | vdcID |
|---|---|---|---|
| candidate1 | pattern1 | 2012/09/27 10:27.31 | vdc1 |
| ... | ... | ... | ... |

FIG. 25
[CANDIDATE 1: ADDITION OF ONE CLONE WEB SERVER]; QUANTITY OF CONSUMPTION OF RESOURCES: 4
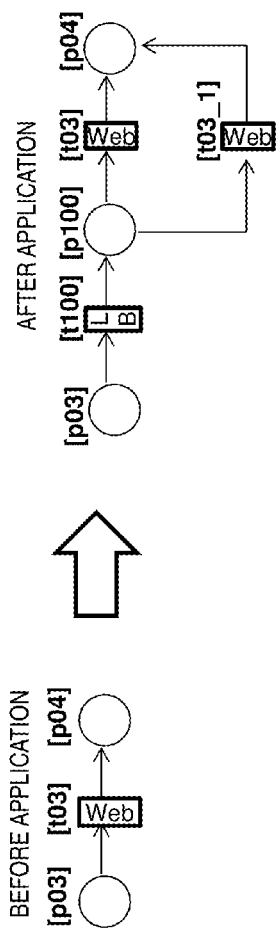
[CANDIDATE 2: REINFORCING WEB SERVER PERFORMANCE]; QUANTITY OF CONSUMPTION OF RESOURCES: 2
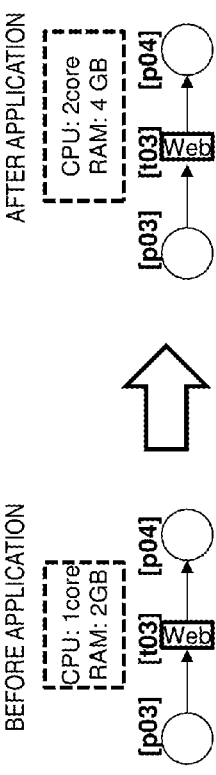
[CANDIDATE 3: LIMITING THE NUMBER OF CONNECTIONS]; QUANTITY OF CONSUMPTION OF RESOURCES: 1
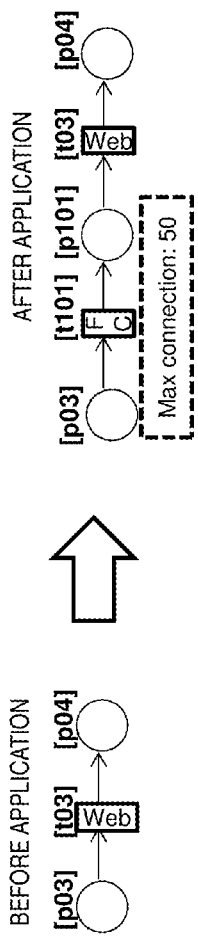

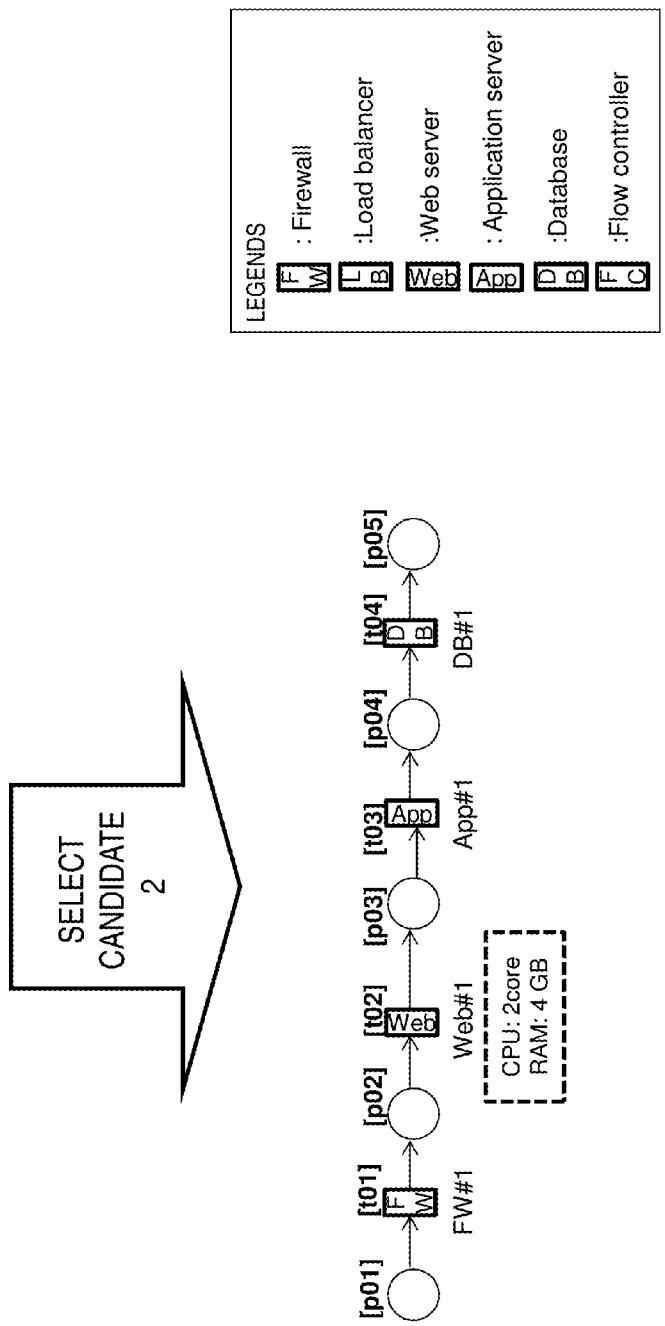

SYSTEM FOR CONTROLLING RESOURCES, CONTROL PATTERN GENERATION APPARATUS, CONTROL APPARATUS, METHOD FOR CONTROLLING RESOURCES AND PROGRAM

REFERENCE TO RELATED APPLICATION

The present application is a National Stage Entry of PCT/JP2014/052239 filed Jan. 31, 2014, which is based on and claims the benefit of the priority of Japanese Patent Application No. 2013-018202 filed on Feb. 1, 2013, the disclosures of all of which are incorporated herein in their entirety by reference.

TECHNICAL FIELD

The present invention relates to a system for controlling resources, an apparatus for generating a control pattern, a control apparatus, a method for controlling resources and a program. More particularly, it relates to a system for controlling resources, an apparatus for generating a control pattern, a control apparatus, a method for controlling the resources and a program, in which control is exercised on resources allocated to a virtual system operating on a virtual datacenter.

BACKGROUND

In a cloud platform, such as IaaS (Infrastructure as a Service), a plurality of virtual datacenters for users, referred to below as (vDCs), reside together, that is, the virtual datacenters are run as they share physical resources on the cloud platform, and a diversity of virtual systems, such as Web servers or systems for distribution of animated pictures, are run on the vDCs.

The use states of these virtual systems are changing with time. Hence, there is known an autonomous control technique which causes the quantities of allocation of server resources, such as virtual CPUs (Central Processing Units) or memories, to be changed in real-time in keeping with the changing use states.

Patent Literature 1 shows a system for brokering resources, in which priority levels for services allocated to respective nodes of resources are associatively set for the nodes of resources, and in which the priority levels set for the respective nodes of resources are updated to higher levels with lapse of processing time of the respective services rendered by the nodes. If there are no vacant nodes of resources to be allocated to a new service, the service(s) allocated to one of a first node of resources and a second node of resources, the services are already allocated to, is changed over to the new service, providing that the node of resources, for which the service has thus been changed over to the new service, has an as-updated priority level lower than the other node of resources.

Patent Literature 2 shows a communication service control system in which the transmission priority level and the call loss ratio are synthesized together to differentiate the service level to implement multiple classes of the quality levels of communication services. It is stated in Patent Literature 2 that the communication service control system includes a transmission control means, controlling the information transmission over a network, based on the transmission priority level, a management means for resources and an admission control means. The management means for resources causes a threshold value of the quantity of resources to be stored in a memory in which the threshold value is correlated with the values of preset multiple admission priority levels of requests for exploiting the communication services. In more detail, the threshold value stored in the memory becomes greater the higher the values of the preset multiple admission priority levels. If there is made a request(s) for exploiting the communication services, the admission control means sums the quantity of use of the resources requested to the current quantity of use of the resources by links used for the communication services of interest. The admission control means then reads out from the memory the threshold value of the quantity of resources corresponding to the admission priority level of the request(s) for use of the resources in question, and compares the so read out threshold value to the sum of the quantities of use of the resources. If the sum of the quantities of use of the resources is not greater than the threshold value, the admission control means admits the request(s) for use. If otherwise, the admission control means refuses the request(s) for use. It is stated that, with the disclosed communication service control system, the standard or reference of the quantity of residual resources that may be admitted is varied for communication services of the same transmission priority level in dependence upon the admission priority level to differentiate the communication quality levels of the communication services having the same transmission priority level. It is also stated that, by so doing, communication services can be provided at a plurality of communication quality levels resulting from combination of the transmission control which is based on the transmission priority level with the admission control which is based on the admission priority level.

Patent Literature 3 shows a distributed work flow simulation system which takes into consideration the influence of resource sharing in a distributed work flow system that manages the flow of business processing by a plurality of work flow execution units.

Non-Patent literatures 1, 2 introduce a technique, termed OpenFlow, enabling dynamic control of network resources.

PATENT LITERATURE

Patent Literature 1: JP Patent 4557949
Patent Literature 2: JP Patent 4627461
Patent Literature 3: JP Patent 4872702

NON PATENT LITERATURE

Non-Patent Literature 1: Nick McKeown and seven others, "OpenFlow: Enabling Innovation in Campus Networks", [online], [retrieved on January 9, Heisei25 (2013)], Internet <URL:http:/www.openflow.org/documents/openflow-wp-latest.pdf>
Non-Patent Literature 2: "OpenFlow Switch Specification" Version 1.3.1 (Wire Protocol 0x04), [online], [retrieved on January 9, Heisei25 (2013)], Internet <URL: http://www.opennetworking.org/images/stories/downloads/specification/openflow-spec-v1.3.1.pdf>

SUMMARY

The following analysis is given by the present invention. In a virtual system operating on a virtual datacenter, mentioned above, there is a demand for such control that reduces the quantity of consumption of resources to as small a value as possible as the service level of performance is maintained. To this end, deciding at which time and in which quantity the server resources and the network resources are to be allocated as well as reflecting the result of the decision has been a requirement.

In this connection, the above mentioned Patent Literatures 1, 2 suffer a drawback that desirable results may not necessarily be obtained should they be put to use in allocating the resources for the virtual system on the vDC. For example, in the system for brokering the resources according to Patent literature 1, it is possible to allocate resources to the nodes of resources, however, the network resources are not taken into consideration. On the other hand, in the communication service control system of Patent Literature 2, it is possible to optimize network resources, however, the server resources are not taken into consideration.

It is an object of the present invention to provide a system for controlling the resources, an apparatus for generating a control pattern, a control apparatus, a method for controlling resources, and a program, in which it is possible to contribute to more efficient distribution of resources to virtual systems operating on a virtual datacenter.

In a first aspect, there is provided a system for controlling the resources including a control pattern generation unit that generates a plurality of control patterns from a virtual system model, produced by modeling the behaviors of a network element(s) and a server(s) of a virtual system(s) operating on a virtual datacenter(s), and from a resource allocation change policy stipulating a policy or policies of change of allocation of resources to the virtual system(s), with the control patterns proving candidates for control commands to network resources and server resources of the virtual system(s), and a control unit that carries out prediction of a service level, with the use of the control patterns, selecting, with the use of the result of prediction, such control pattern that satisfies the service level of the virtual system(s) and that also satisfies a preset standard or reference for selection, from among the plurality of control patterns, and putting the control pattern selected to use.

In a second aspect, there is provided a control pattern generating apparatus for generating a plurality of control patterns from a virtual system model(s), produced by modeling the behaviors of a network element(s) and a server(s) of a virtual system(s) operating on a virtual datacenter(s), and from a resource allocation change policy stipulating a policy or policies of change of allocation of resources to the virtual system(s), with the control patterns proving candidates for control commands to network resources and server resources of the virtual system(s).

In a third aspect, there is provided a control apparatus that carries out prediction of a service level, using a plurality of control patterns, with the control patterns proving candidates for control commands to network resources and server resources of a virtual system(s), selects, with the use of the result of prediction, such control pattern that satisfies a service level of the virtual system(s) and that also satisfies a preset standard or reference for selection, from among the plurality of control patterns, and puts the control pattern selected to use.

In a fourth aspect, there is provided a method for controlling resources comprising generating a plurality of control patterns from a virtual system model(s), produced by modeling the behaviors of a network element(s) and a server(s) of a virtual system(s) operating on a virtual datacenter(s), and from a resource allocation change policy stipulating a policy or policies of change of allocation of resources to the virtual system(s), with the control patterns proving candidates for control commands to network resources and server resources of the virtual system(s), carrying out prediction of a service level, with the use of the plurality of control patterns, selecting, with the use of the result of prediction, such control pattern that satisfies a service level of the virtual system(s) and that also satisfies a preset standard or reference for selection, from among the plurality of control patterns, and putting the control pattern selected to use. The present method is bound up with a particular machine which is a system for controlling the resources that controls resources allocated to the virtual system(s) operating on the virtual datacenter(s).

In a fifth aspect, there is provided a program that causes a computer, making up a system for controlling the resources, to perform a processing of generating a plurality of control patterns from a virtual system model(s), produced by modeling the behaviors of a network element(s) and a server(s) of a virtual system(s) operating on a virtual datacenter(s), and from a resource allocation change policy stipulating a policy or policies of change of allocation of resources to the virtual system(s), with the control patterns proving candidates for control commands to network resources and server resources of the virtual system(s), and a processing of carrying out prediction of a service level, with the use of the plurality of control patterns, selecting, with the use of the result of prediction, such control pattern that satisfies a service level of the virtual system(s) and that also satisfies a preset standard or reference for selection, from among the plurality of control patterns, and putting the control pattern selected to use. The present program can be recorded on a computer-readable (non-transient) recording medium. That is, the present invention can be implemented as a computer program product.

The meritorious effects of the present invention are summarized as follows.

According to the present invention, resources can be efficiently allocated to the virtual system(s) operating on the virtual datacenter(s). That means that the present invention transforms the prior art structure into the a virtual system(s) in which resources are optimally allocated.

BRIEF DESCRIPTION OF THE DRAWINGS

FIG. 7 is a tabular view showing an example of the monitoring information of the virtual system operating on the virtual datacenter (vDC).

FIG. 9 is a schematic view showing the construction information of the virtual system shown in FIG. 8.

FIG. 10 is a tabular view showing an example of an equation for prediction generated by the system for controlling the resources of the exemplary embodiment 1 according to the present disclosure.

FIG. 11 is a schematic view showing an example system model generated by the system for controlling the resources of the exemplary embodiment 1 according to the present disclosure.

FIG. 12 shows two example resource allocation policies.

FIG. 13 is a schematic view showing resource allocation change policies for matching corresponding to the resource allocation policies of FIG. 12.

FIG. 14 is a schematic view showing a control pattern obtained on applying the resource allocation change policy (changing over load balancers) of FIG. 12 to the virtual system model of FIG. 11.

FIG. 16 is a schematic view showing a control pattern obtained on applying the resource allocation change policy (addition of server resources for DB) of FIG. 12 to the virtual system model of FIG. 11.

FIG. 17 is a schematic view continuing to FIG. 16.

FIG. 19 is a graph showing other example resource allocation change policies.

FIG. 20 is a graph showing further example resource allocation change policies.

FIG. 21 is a tabular view showing example results of simulation made using the control pattern shown in FIG. 14, FIG. 16 and FIG. 17.

FIG. 22 is a tabular view showing example service level designations of virtual systems operating on the virtual datacenters (vDCs).

FIG. 23 is a tabular view showing control patterns already evaluated (selected).

FIG. 25 is a graph showing candidates for resource allocation change policies applicable to the virtual system shown in FIG. 24.

FIG. 26 is a schematic view for illustrating the results of the simulation with the use of the control pattern generated using the resource allocation change policies of FIG. 25 and a candidate selected.

PREFERRED MODES

Initially, a summary of an exemplary embodiment of the present disclosure will be described with reference to the drawings. It should be noted that symbols for referencing the drawings are entered in the summary merely as examples to assist in understanding but are not intended to limit the present disclosure to the mode illustrated.

Figure 1:
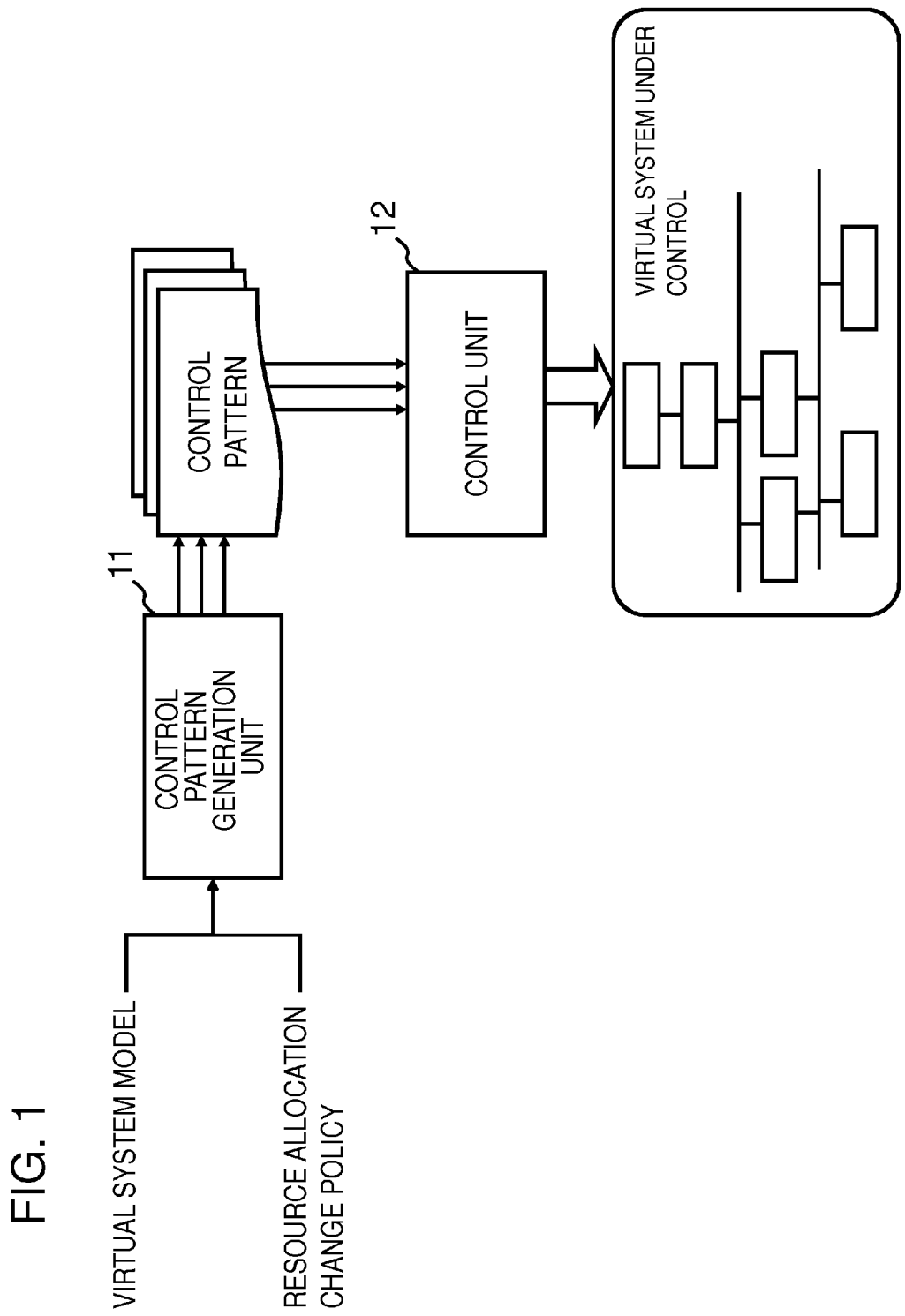
FIG. 1 is a schematic view showing a configuration of an exemplary embodiment according to the present disclosure.

A preferred form of the present disclosure may be implemented by a control pattern generation unit 11, configured for producing a plurality of control patterns, and a control unit 12, configured for controlling a virtual system using one selected out of the control patterns, as shown in FIG. 1. The control patterns are to become candidates of control commands to network resources and server resources of the virtual system.

More specifically, the control pattern generation unit 11 generates a plurality of control patterns from a virtual system model and from policies of changes of the allocation of resources to the virtual system. The virtual system model has been generated by modeling the behaviors of network elements and servers of the virtual system operating on a virtual datacenter. The control patterns are to become candidates of control commands to the network resources and server resources of the virtual system.

The control unit 12 predicts service levels, using the above mentioned multiple control patterns. Then, based on predicted results, the control unit selects and applies such a one of the multiple control patterns which will satisfy the service levels of the virtual system as well as satisfying a preset standard or reference.

As the preset standard or reference, such a one that may lead to use of the control pattern which will minimize the quantity of consumption of the network resources as well as server resources, may be used, in which case the quantity of the use of the resources of the virtual system in question may be minimized. This may lead to an increased quantity of resources that can be allocated to other virtual datacenters (vDCs) or other virtual systems.

The above mentioned preset standard or reference is not limited to such standard or reference which will lead to use of the smallest quantity of consumption of the resources used. For example, such control pattern may be selected which will lead to a decreased quantity of consumption of whichever one of server resources or network resources that is higher in priority level in consideration of states of global tightness of the resources. Such a control pattern may also be selected which will be in keeping with the anticipated state at some future time in consideration of the statistically estimated service demand or the network traffic.

Thus, the preferred form of the present disclosure, described above, may enable optimum allocation of network and server resources. In addition, the preferred form of the present disclosure enables management costs of the virtual systems on the virtual datacenters (vDCs) to be reduced. The reason is that, since the allocated quantities of the server resources and network resources can automatically be controlled, it is possible to reduce the work load on management operators.

[Exemplary Embodiment 1]

Figure 2:
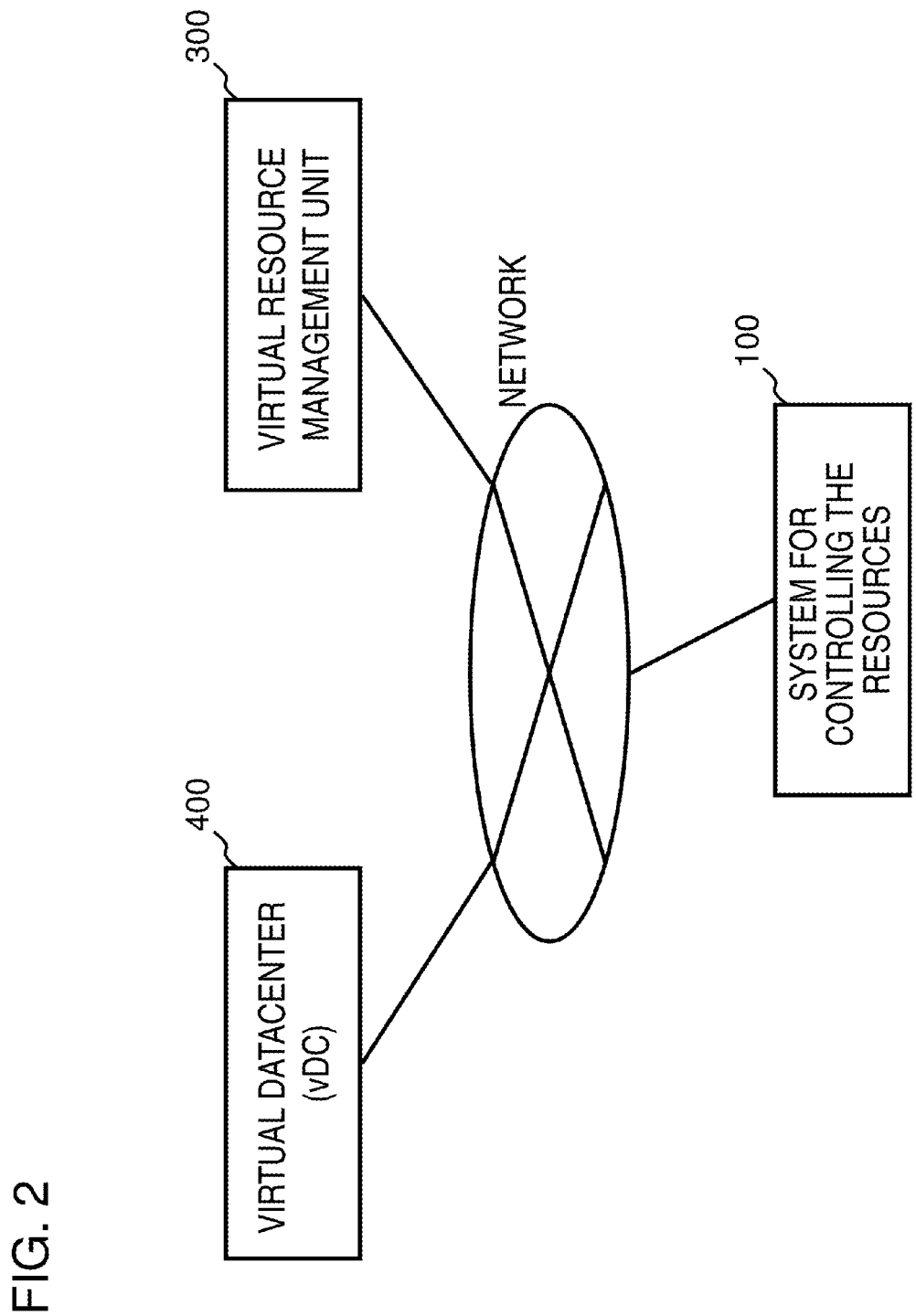
FIG. 2 is a schematic view showing a system configuration of an exemplary embodiment 1 according to the present disclosure.

An exemplary embodiment 1 of the present disclosure will now be described in detail with reference to the drawings. FIG. 2 shows a system configuration of an exemplary embodiment 1 of the present disclosure. Referring to FIG. 2, there is shown a configuration including a plurality of virtual datacenters 400, co-residing on a cloud platform, a virtual resource management unit 300, configured for allocating resources to the virtual system(s) on the virtual datacenter 400, and a system for controlling the resources 100, in a state interconnected over a network.

Figure 3:
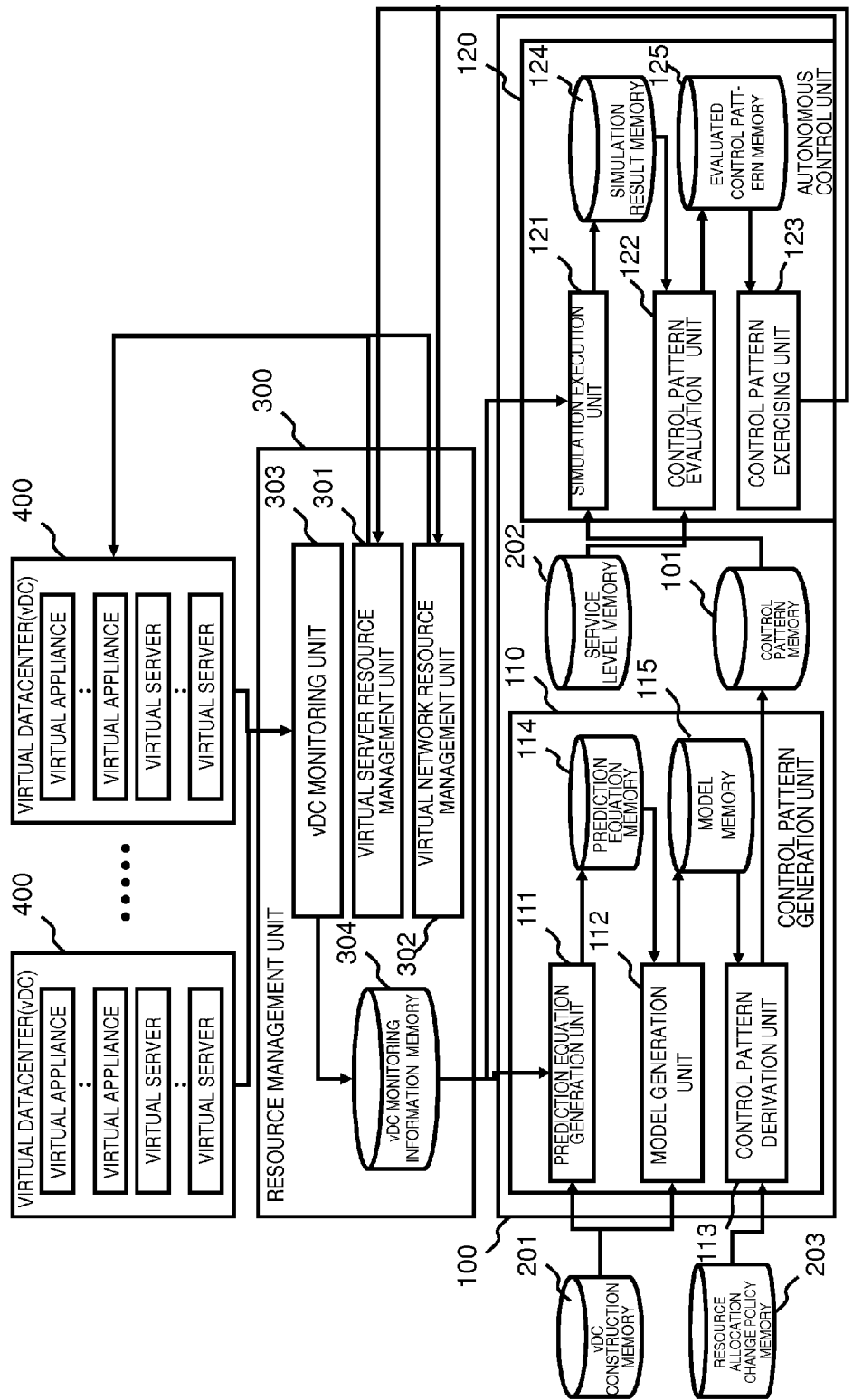
FIG. 3 is a functional block diagram showing a detailed configuration of the exemplary embodiment 1 according to the present disclosure.

FIG. 3 depicts a block diagram showing a detailed configuration of the exemplary embodiment 1 of the present disclosure. A virtual datacenter (vDC) 400 provides a plurality of users of the virtual datacenter with a virtual system(s) composed by a virtual appliance(s) and a virtual server(s).

Figure 4:
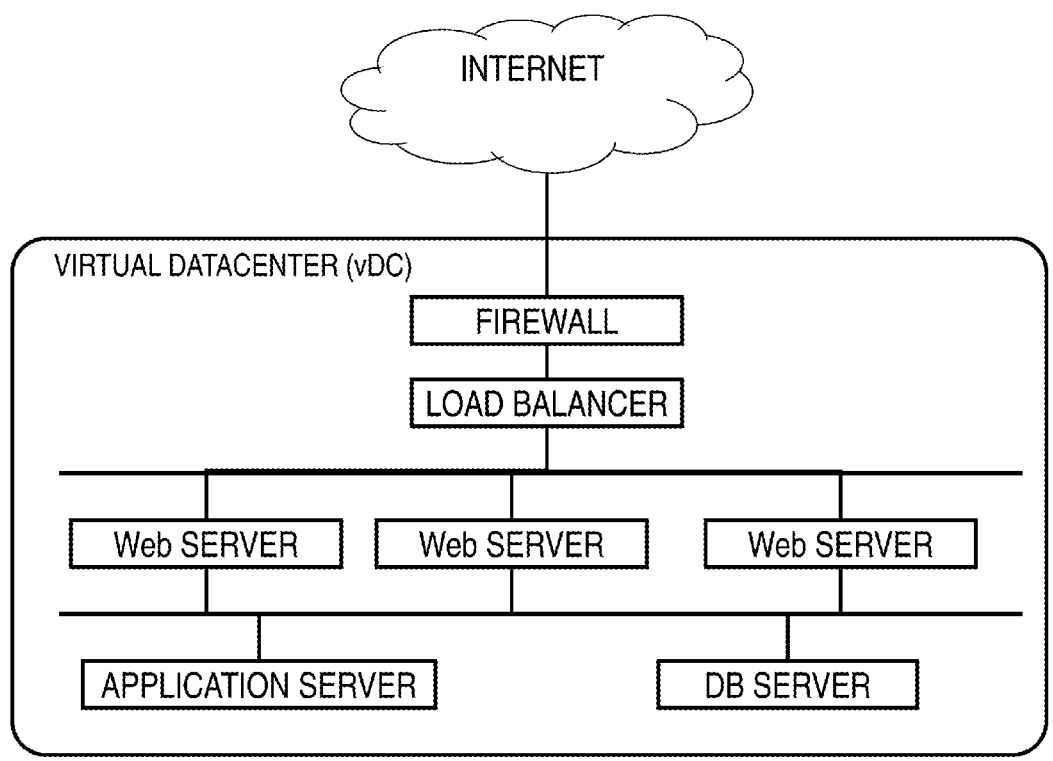
FIG. 4 is a schematic view showing an example virtual system operating on a virtual datacenter (vDC).

FIG. 4 shows an example virtual system which the virtual datacenter (vDC) 400 may provide for virtual datacenter users. In the example of FIG. 4, there is shown a configuration including a firewall, controlling the communication between the Internet and the virtual system, a load balancer, distributing accesses from the side Internet to a plurality of Web servers, an application server and a database server (DB server). The application server and the DB server render services in response to a request(s) from the Web server(s). It should be noted that these units do not have to be physically independent and may be constructed by a virtual entity or entities. For example, the Web servers, application server or the DB server may be virtual servers constructed by server virtualization techniques. On the other hand, the firewall or the load balancer may be implemented by a particular switch or switches according to the Non-Patent Literatures 1, 2 provided that the switch or switches is configured for operating like the firewall or the load balancer.

The virtual resource management unit 300 performs the functions of managing the quantities of resources allocated to the virtual system on the virtual datacenter 400 or monitoring the use states of the virtual system. Specifically, the virtual resource management unit 300 includes a virtual server resource management unit 301, a virtual network resource management unit 302 and a virtual datacenter (vDC) monitoring unit 303. The virtual server resource management unit 301 manages the resources of the virtual servers, such as the above mentioned Web servers, application server or DB server, and the virtual network resource management unit 302 manages network resources. The vDC monitoring unit 303 outputs use states of the virtual system to a vDC monitoring information memory 304 at a preset time interval to provide monitoring functions for the virtual system.

The system for controlling the resources 100 includes a control pattern generation unit 110 and an autonomous control unit 120, and provides the function of generating control patterns which will prove candidates for control commands as well as the function of selecting one control pattern which is in keeping with the operating state of the virtual system, so as to change the allocation of the resources through the virtual resource management unit.

A vDC construction memory 201 stores the construction information of the virtual system operating on the virtual datacenter (vDC) configured to be controlled by the system for controlling the resources 100. The construction information is shown for example in FIG. 7 and FIG. 8.

A resource allocation change policy memory 203 stores resource allocation change policies that may be applied to components making up the virtual system. See for example FIG. 13, FIG. 15 and FIG. 16. By the way, the values of consumption of resources, quantifying the additional resources, needed for control, are set in the resource allocation change policies. For example, see the field of the quantities of consumption of resources of FIG. 14.

The control pattern generation unit 110 includes a prediction equation generation unit 111, a model generation unit 112 and a control pattern derivation unit 113.

The prediction equation generation unit 111 takes out the component information of components being predicted, such as virtual appliances or virtual servers of the virtual systems, from the construction information of the virtual system stored in the vDC construction memory 201. The prediction equation generation unit then generates an equation of prediction from which to find the processing time following the changing of the quantities of the resources allocated to the respective components. The equation of prediction can be generated with the use of multivariate statistics based on the real processing time per unit request of each virtual appliance or virtual server and on the monitoring information for the quantities of resources already allocated. The processing time as being the result of the prediction can be obtained by entering the number of concurrent requests for processing anticipated at the time of the prediction as well as the quantities of allocated resources.

The model generation unit 112 synthesizes the equation of prediction into the construction information of the virtual system stored in the vDC construction memory 201 to generate a virtual system model which is an abstraction of the behaviors of the virtual system operating within the virtual datacenter (vDC).

The control pattern derivation unit 113 selects the resource allocation change policies that may be applied to the virtual system model and synthesizes the resource allocation change policies to the system model to generate a plurality of control patterns which may prove candidates of the contents of control commands. The control pattern derivation unit 113 stores the control patterns generated in a control pattern memory 101.

The autonomous control unit 120 includes a simulation execution unit 121, a control pattern evaluation unit 122 and a control pattern exercising unit 123. From the control patterns, the monitoring information for the virtual system on the virtual datacenter (vDC) and from the service level information of the virtual system, the autonomous control unit selects an optimum control pattern for the server resources and the network resources and applies or exercises the so selected optimum control pattern. The information concerning the quantities of consumption of resources may be appended as necessary to the control patterns.

The simulation execution unit 121 takes out the control patterns of the virtual system being simulated from the control pattern memory 101 and enters the contents of the vDC monitoring information to simulate the behavior of the respective control patterns to predict the average processing time. The results simulated are stored in a simulation result memory 124.

Using a preset control pattern selection rule, the control pattern evaluation unit 122 selects the control pattern to be applied or exercised from among the respective control patterns predicted by the simulation execution unit 121. In the subject exemplary embodiment, it is assumed that there is set a control pattern selection rule stating that such a control pattern is to be selected that the average processing time will satisfy the service level stored in a service level memory 202 and the quantity of consumption of resources will be minimal. The results of evaluation by the control pattern evaluation unit 122 are stored in an evaluated control pattern memory 125.

The control pattern exercising unit 123 resolves the control pattern, selected by the control pattern evaluation unit 122, into a server resource control command and a network resource control command, and informs the virtual resource management unit 300 about the resolution so as to change the allocation of the resources.

It should be noted that respective parts (processing unit) of the system for controlling the resources, shown in FIG. 1, may be implemented by a computer program that causes a computer(s) making up the system for controlling the resources to execute the above mentioned processing operations using the computer hardware. It should also be noted that components expressed as 'means' may also be expressed as 'members' or 'units' to denote units of the hardware, units of component parts by a computer program, or system component units.

The operation of the subject exemplary embodiment will now be described in detail with reference to the drawings. Initially, the processing of generating a control pattern by the system for controlling the resources according to the exemplary embodiment 1 will be explained by referring to a flowchart of FIG. 5.

[Procedure of Generating a Control Pattern]

Figure 5:
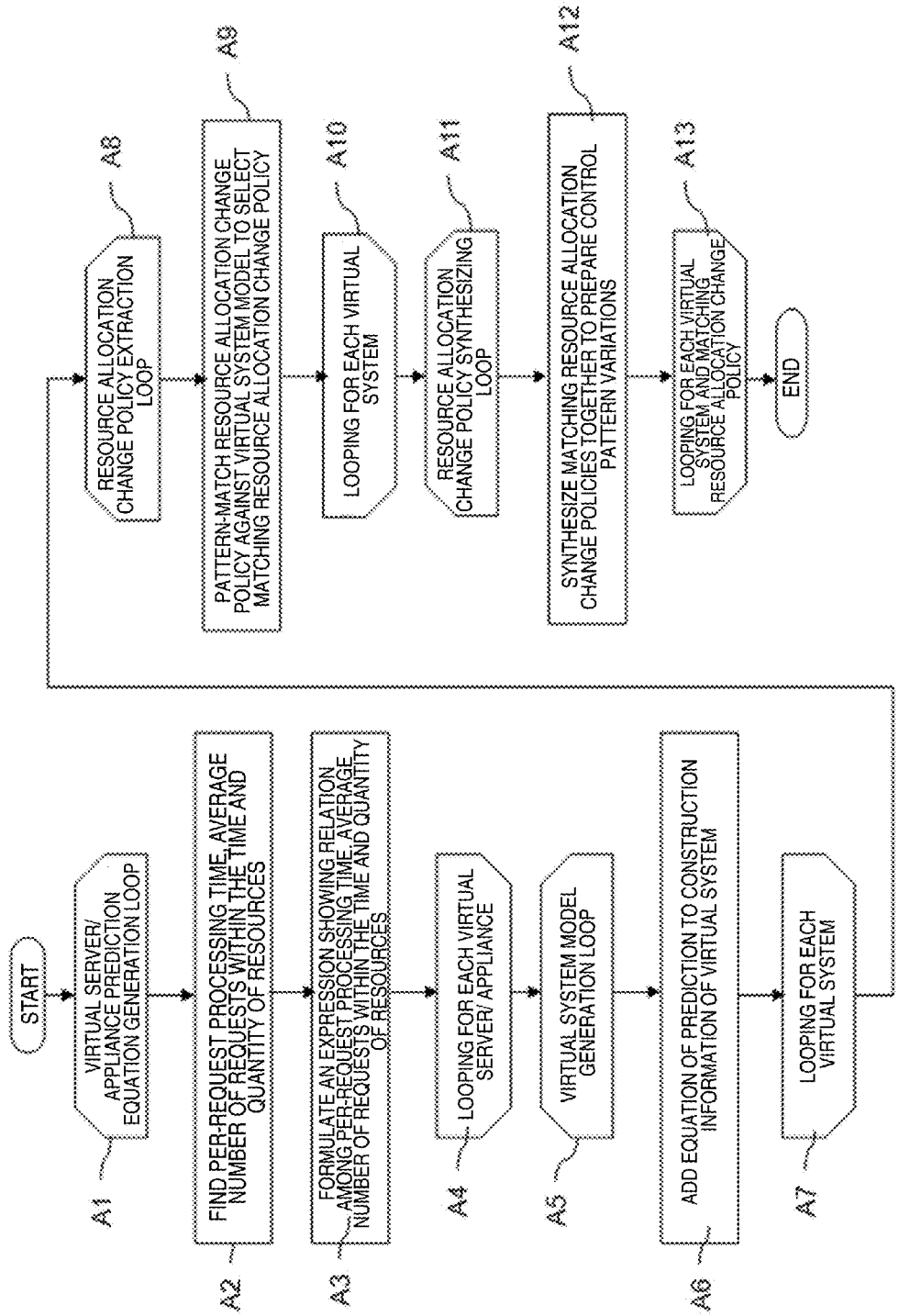
FIG. 5 is a flowchart showing the operation (processing of generation of a control pattern) of a system for controlling the resources of the exemplary embodiment 1 according to the present disclosure.

FIG. 5 depicts a flowchart showing the operation of the system for controlling the resources of the exemplary embodiment 1 of the present disclosure (the processing of generating the control pattern). Referring to FIG. 5, the prediction equation generation unit 111 of the control pattern generation unit 110 initially takes out, from the vDC construction memory 201, the information concerning the virtual servers and the virtual appliances that make up the virtual system operating on the virtual datacenter (vDC). The prediction equation generation unit then generates an equation of prediction that may be used to find the processing time for each of the virtual servers and the virtual appliances (loop of step A1 to step A4).

Specifically, the prediction equation generation unit 111 takes out the monitoring information of a virtual system of interest from the vDC monitoring information memory 304, and acquires the processing time per a request made to the virtual server or the virtual appliance, an equation of prediction for which is being formed. The prediction equation generation unit also acquires an average number of requests within the processing time, while also acquiring, from the vDC construction memory 201, the quantities of memory resources as well as the number of CPU cores, etc. allocated to the virtual servers or the virtual appliances, the equations of prediction for which are being formed (step A2).

The prediction equation generation unit 111 formulates an equation showing the relationship among the per-request processing time, an average number of concurrent requests within the processing time, and the quantities of resources. The prediction equation generation unit stores the so formulated equation for prediction in a prediction equation memory 114 (step A3).

To generate the equation for prediction, a method shown in Patent Literature 3, for example, may be used. The following equation for prediction:

$$T=\gamma M+\delta$$

may be obtained, where T is the processing time for the virtual server or the virtual appliance, an equation for prediction for which is being produced, M is an average number of concurrent requests, and $\gamma$, $\delta$ are coefficient and a constant used for expression as an equation.

Then, using the virtual system construction information, taken out from the vDC construction memory 201, and the above mentioned equation for prediction, the model generation unit 112 generates a virtual system model for each of the virtual systems, the virtual system models for which are being generated (loop of steps A5 to A7).

Specifically, the model generation unit 112 takes out the equation for prediction from the prediction equation memory 114 and appends it to the construction information of the virtual system, the virtual system model for which is being generated. This generates a virtual system model(s), which is then stored in a model memory 115 (step A6).

The control pattern derivation unit 113 then collates the virtual system models, taken out from the model memory 115, against the resource allocation change policies, stating the method for changing the resource allocation, taken out from the resource allocation change policy memory 203. This selects the resource allocation change policies that may be applied to respective virtual systems (loop of steps A8 to A10).

Specifically, the control pattern derivation unit 113 pattern-matches the resource allocation change policies against the virtual system model, taken out from the model memory 115, so as to select the matching resource allocation change policy or policies (step A9).

The control pattern derivation unit 113 synthesizes the resource allocation change policy or policies, applicable to the virtual system model, taken out from the model memory 115, to one another so as to generate a control pattern(s) which is to prove a candidate for the content of the control command for the relevant system. The control pattern derivation unit stores the so generated control pattern(s) in the control pattern memory 101 (loop of steps A11 to A13). By the way, the quantities of consumption of resources of the respective control pattern(s) are also associated with the control pattern(s) stored in the control pattern memory 101 for storage together with the control pattern(s). In the subject exemplary embodiment, a sum of the quantities of consumption of resources of the resource allocation change policies synthesized is used as the quantity of consumption of resources of the control pattern(s).

Referring to the flowchart of FIG. 6, the autonomous control operation by the system for controlling the resources of the exemplary embodiment 1 will now be explained.

[Procedure of Generation of Control Patterns]

Figure 6:
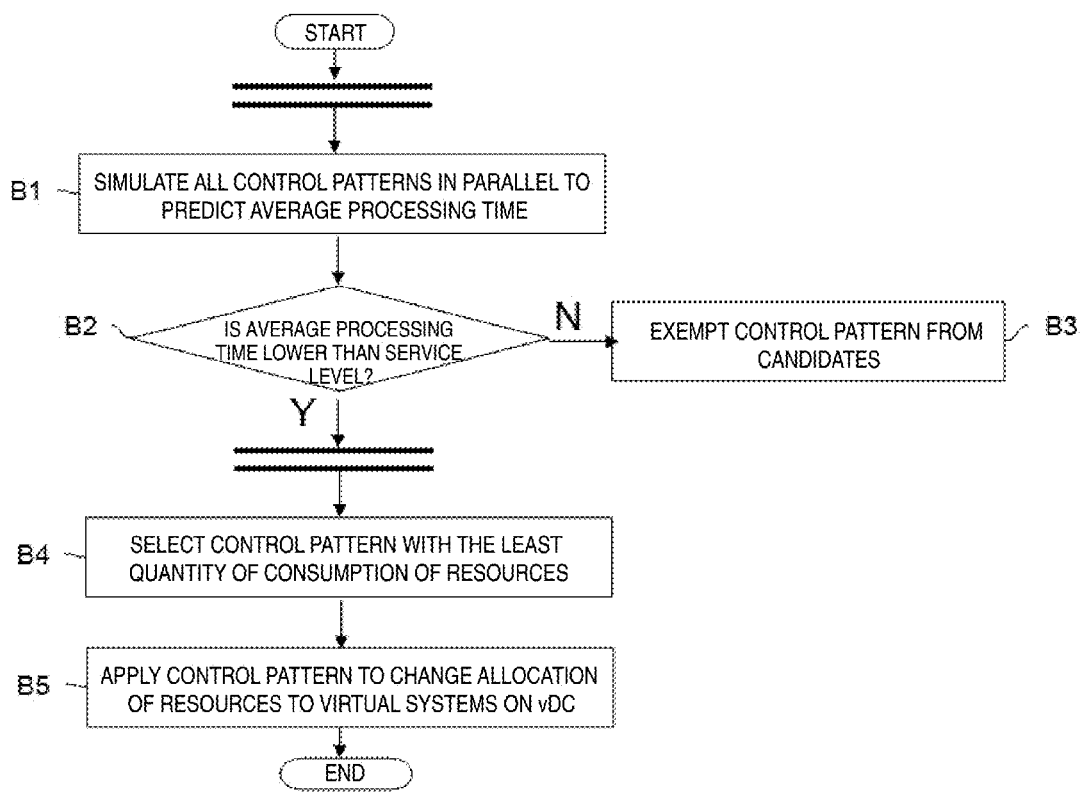
FIG. 6 is a flowchart showing the operation (autonomous control) of the system for controlling the resources of the exemplary embodiment 1 according to the present disclosure.

FIG. 6 depicts a flowchart showing the operation (autonomous control) of a system for controlling the resources of the exemplary embodiment 1 of the present disclosure. Referring to FIG. 6, the simulation execution unit 121 of the autonomous control unit 120 reads out a set of control patterns concerning the virtual system operating on the virtual datacenter (vDC) from the control pattern memory 101, while taking out the latest monitoring information of the virtual system from the vDC monitoring information memory 304. The simulation execution unit 121 simulates the total of the control patterns to predict the average processing time for each control pattern to store the results of the simulation in the simulation result memory 124 (step B1).

The control pattern evaluation unit 122 then takes out the results of the simulation from the simulation result memory 124, while taking out the service level designation of the virtual system in question from the service level memory 202, so as to decide whether or not the average processing time is less than the service level (step B2).

If the result of the decision indicates that the average processing time exceeds the service level, that is, fails to satisfy the service level, the control pattern evaluation unit 122 exempts the control pattern from the candidates to be applied (step B3).

The control pattern evaluation unit 122 compares the control patterns, having the average processing time less than the service level, to one another, and selects the control pattern with the least quantity of consumption of resources, as an example. The control pattern evaluation unit stores the so selected control pattern in the evaluated control pattern memory 125 (step B4). This selects the control pattern that is in keeping with the latest operating states of the virtual system.

The control pattern exercising unit 123 then takes out the selected control pattern from the control pattern memory 101 based on the information stored in the evaluated control pattern memory 125. The control pattern exercising unit 123 resolves the control pattern into a server resource control command and a network resource control command, and issues control commands to the virtual server resource management unit 301 and to the virtual network resource management unit 302. This changes the allocation of resources to the virtual system on the virtual datacenter (vDC).

According to the subject exemplary embodiment, described above, the autonomous control unit 120 selects and applies the optimum control pattern in keeping with the latest operating states of the virtual system on the virtual datacenter (vDC), so that it is possible to optimize allocation of resources to the virtual system.

The operation of the exemplary embodiment 1 of the present disclosure will supplementarily be explained using more concrete examples. In the explanation to follow, it is supposed that a virtual system having, as components, virtual appliances and virtual servers, such as firewalls, load balancers, Web servers, application servers and DB servers, is in operation on the virtual datacenter (vDC), as shown in FIG. 4. By the virtual appliances are meant virtual machines, operating as network appliances, such as firewalls or load balancers. The vDC monitoring unit 303 monitors the operating states of the present system from component to component to store the monitored result in the vDC monitoring information memory 304.

FIG. 7 shows examples of the monitoring information stored in the vDC monitoring information memory 304. In the examples of FIG. 7, the monitoring information for the Web server (Web1) as well as the firewall (FW1) is stored in a virtual datacenter having a virtual data center ID (vDCID) equal to 1. In the examples of FIG. 7, if a number of request(s) are concurrently processed in a component, the number of the requests being concurrently processed is recorded as the average number of the concurrently processed requests.

Figure 8:
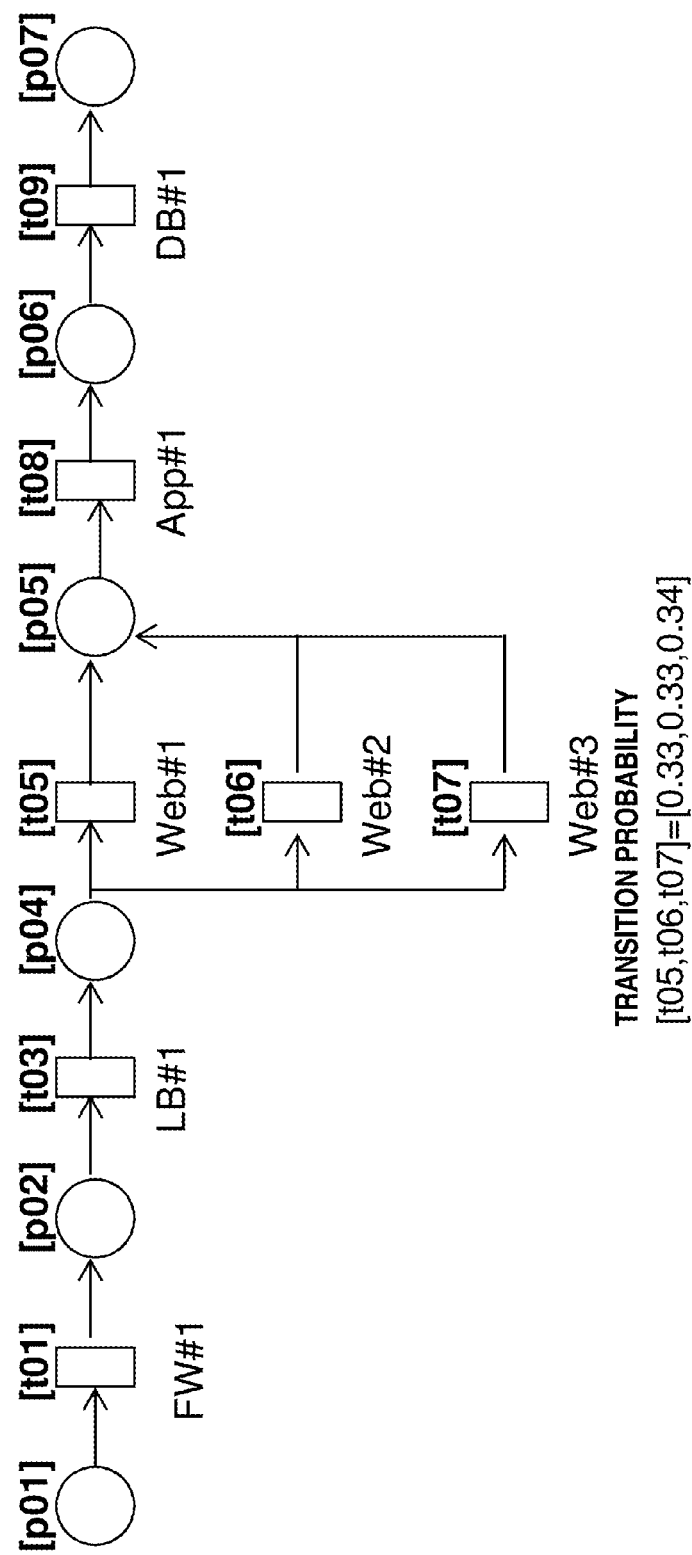
FIG. 8 is a graph showing the virtual system of FIG. 4.

If a modeling technique, typified by Petri Net, is used, the present virtual system can be expressed by a directed bipartite graph in which a component is represented by a transition and a corresponding message by a place (circle), as shown in FIG. 8. It is only sufficient that the construction information equivalent to this directed bipartite graph is stored in the vDC construction memory 201.

FIG. 9 shows the construction information of the virtual system stored in the vDC construction memory 201. In the example of FIG. 9, places are first defined and components of the virtual system of the virtual datacenter vDC are stated as transitions. Next, the information representing the concerting relationship (relationship of interconnections) among these places and transitions is stored.

[Processing of Control Pattern Generation]

Based on the above premises, the processing of generating the control pattern will be explained. Initially, the prediction equation generation unit 111 of the control pattern generation unit 110 takes out the construction information of the virtual system shown in FIG. 9 from the vDC construction memory 201. Then, using the names of the virtual servers and the virtual appliances, such as FW1 and Web1, stated as transitions in the above construction information, as keys, the prediction equation generation unit 111 takes out the monitoring information of relevant components from the vDC monitoring information memory 304. The prediction equation generation unit 111 then gets the processing time of requests of the components and the average number of the requests made within the processing time. The prediction equation generation unit 111 also acquires, from the vDC construction memory 201, the quantities of resources already allocated, such as the memory storage capacity or the number of CPU cores allocated to the virtual servers and appliances. Then, using the multivariate statistics, the prediction equation generation unit 111 formulates the relationship among the processing time per request, the average number of concurrent requests within the processing time and the quantities of resources, as an equation of prediction.

FIG. 10 shows example equations of prediction generated by the prediction equation generation unit 111 and stored in the prediction equation memory 114. In the examples of FIG. 10, the following equation of prediction:

$$T\_web1 = \alpha 3 * X\_p04 / (\gamma 3 * cpu3 + \delta 3 * ram3) + \beta 3$$

is formed, where X_p04 is the number of concurrent requests in Web1, cpu3 the number of allocated virtual CPU cores and ram3 a parameter representing an allocated RAM memory storage capacity. $\alpha 3$, $\gamma 3$, $\delta 3$ and $\beta 3$ are coefficients and an intercept as found by the multivariate statistics. By the way, there are cases where the component, such as Web server "Web1", receives requests of different sorts. In such case, the processing time for these requests may be separately calculated and weighted averaging taken of the so calculated processing time. Or, if the requests are of different sorts but there is no difference in the processing time, the requests may be handled as requests of the same sort.

The model generation unit 112 introduces the equation of prediction taken out from the prediction equation memory 114 into the construction information of the virtual system, taken out from the vDC construction memory 201, shown in FIG. 9, to generate a virtual system model, which is then stored in the model memory 115.

FIG. 11 shows an example virtual system model generated by the model generation unit 112 and stored in the model memory 115. In the example of FIG. 11, the equation of prediction is added to each component of the construction information of the virtual system shown in FIG. 9.

The control pattern derivation unit 113 then collates the virtual system model, shown in FIG. 11, against the resource allocation change policies, so as to extract the resource allocation change policy or policies applicable to the virtual system model of interest.

FIG. 12 depicts a diagram showing resource allocation change policies A, B applicable to a load balancer on the virtual system. The resource allocation change policies are shown in the same way as the above mentioned Petri Net. The resource allocation change policy A of FIG. 12 changes over a load balancer to a single flow controller (FC1) and two load balancers. The resource allocation change policy B of FIG. 12 adds resources (memory and the number of CPU cores) to a load balancer.

FIG. 13 depicts a tabular view showing resource allocation change policies equivalent to the resource allocation change policies shown in FIG. 12. An example shown in FIG. 13 shows entries in which not only the policy IDs and policy names but also the information concerning patterns of application used in matching against the virtual system, detailed contents of the resource allocation change policies and the quantities of consumption of resources in case of using the resource allocation change policies of FIG. 12, are correlated to one another.

By matching the patterns of application of the resource allocation change policy or policies, shown in FIG. 13, against the virtual system model, shown in FIG. 11, it is possible to extract the resource allocation change policy or policies applicable to the virtual system model in question. For example, the resource allocation change policy A shown in FIG. 12 and FIG. 13, in which a load balancer is changed over to one flow controller and two load balancers, matches the construction information concerning the load balancer in the virtual system model shown in FIG. 11. In similar manner, the resource allocation change policy B shown in FIG. 12 and FIG. 13, in which resources of a server for DB are added, matches the construction information concerning the DB server in the virtual system model shown in FIG. 11.

Figure 15:
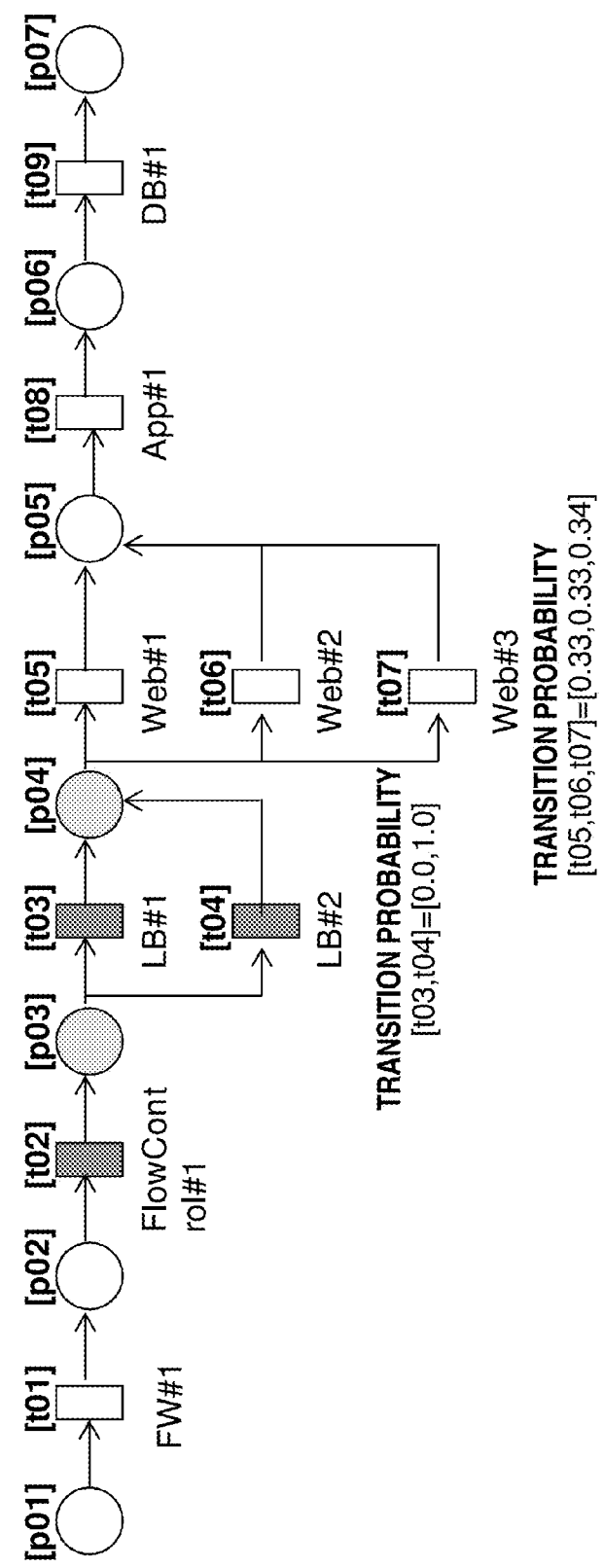
FIG. 15 is a graph showing the control pattern of FIG. 14.

The control pattern derivation unit 113 synthesizes the resource allocation change policy or policies, obtained as described above, to generate the control pattern. FIG. 14 shows an example in which just the resource allocation change policy A of changing over the load balancer shown in FIG. 12 and FIG. 13 is applied to the virtual system model shown in FIG. 11. FIG. 15 depicts a graph equivalent to FIG. 14.

Figure 18:
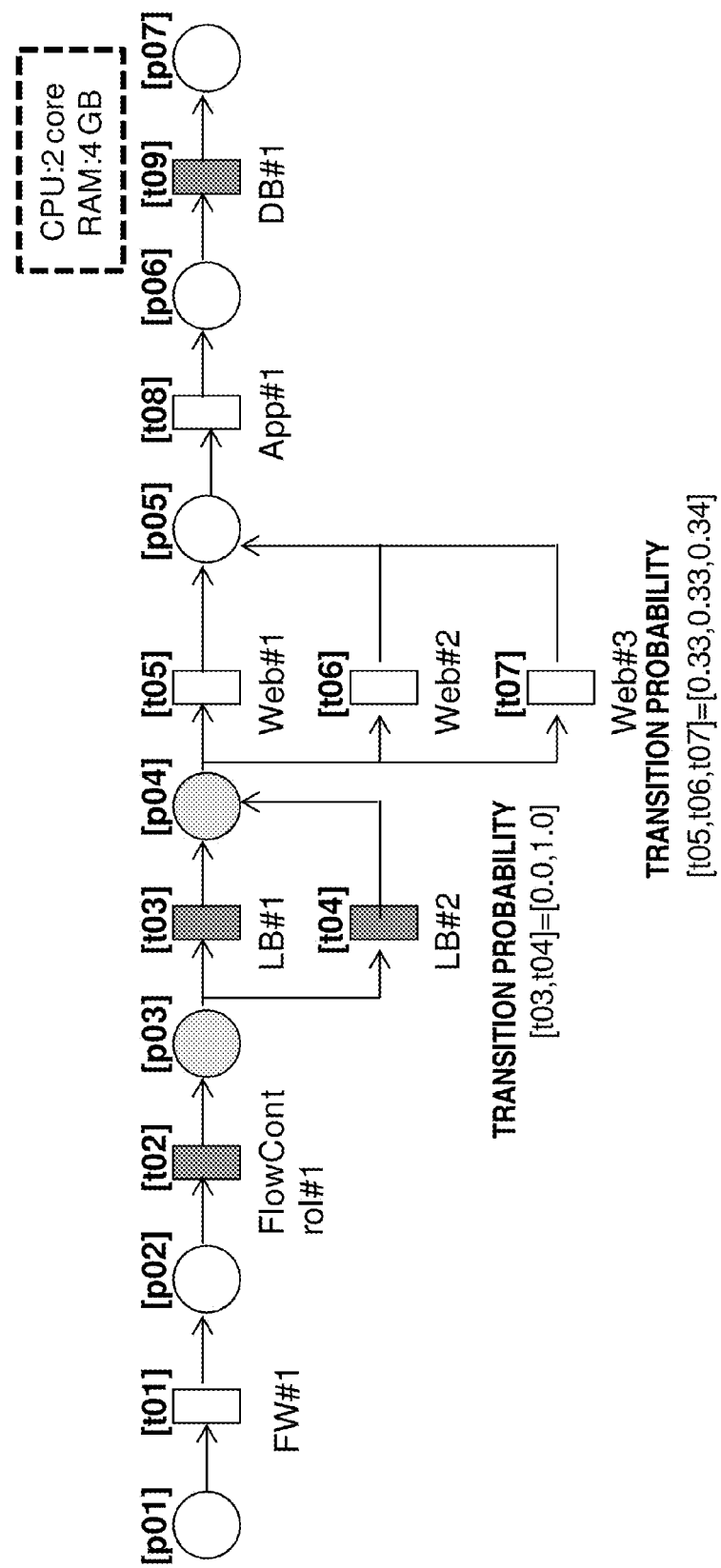
FIG. 18 is a graph showing the control pattern of FIG. 16 and FIG. 17.

In similar manner, FIG. 16 and FIG. 17 show an example in which both the resource allocation change policy A of changing over a load balancer and the resource allocation change policy B of adding resources of the server for DB, shown in FIG. 12 and FIG. 13, are applied to the virtual system model shown in FIG. 11. FIG. 18 depicts a graph equivalent to FIG. 16 and FIG. 17. By the way, in the example of FIG. 16, both the resource allocation change policy A of changing over the load balancer and the resource allocation change policy B of adding resources to the load balancer, shown in FIG. 12 and FIG. 13, are applied. Hence, the quantity of consumption of resources is equal to the sum of the consumption of the resources of the respective resource allocation change policies, that is, equal to "6".

In addition, the control pattern derivation unit 113 formulates a control pattern in which just the resource allocation change policy B of adding the server resources for DB shown in FIG. 12 and FIG. 13 is applied to the virtual system model shown in FIG. 11.

In the above example, it is assumed that the number of the resource allocation change policies is two, only for simplicity of explanation. The resource allocation change policies may be broken down into a wide variety of patterns, as shown in FIG. 19 and FIG. 20. For example, FIG. 19 shows, like FIG. 12, a resource allocation change policy in which a clone is added to a component by way of scale-out as well as a resource allocation change policy in which resources are added to a component. A resource allocation change policy, shown in an upper part of FIG. 20, adds not only a clone but also a flow controller to a component to exercise path control. A resource allocation change policy, shown in a lower part of FIG. 20, adds a flow controller ahead of a component to exercise flow control. The control pattern derivation unit 113 uses these resource allocation change policies alone or in combination to generate a control pattern(s).

[Sequence of Autonomous Control]

The autonomous control processing, referred to above, will now be explained. The simulation execution unit 121 of the autonomous control unit 120 reads out, from the control pattern memory 101, a set of control patterns of a virtual system, as a subject of the autonomous control, as shown in FIG. 14, FIG. 16 and FIG. 17. Moreover, the simulation execution unit 121 takes out, from the vDC monitoring information memory 304, the latest monitoring information (the information continuing for 30 minutes) of a firewall part of the monitoring information of the virtual system in question so as to deliver the so taken out information to the virtual system. The simulation execution unit delivers the information as input to the respective control patterns to predict the average processing time of each control pattern. FIG. 21 shows the result of the simulation of the control patterns by the simulation execution unit 121 shown in FIG. 14, FIG. 16 and FIG. 17.

The control pattern evaluation unit 122 takes out the result of the simulation from the simulation result memory 124, while also taking out the service level designations of the virtual system, shown in FIG. 22, from the service level memory 202, in order decide whether or not the average processing time predicted for the case of using each control pattern is below the service level.

If, as a result of the above decision, the average processing time of one or more control patterns exceeds a service level, the control pattern evaluation unit 122 exempts the control pattern(s) from the set of applicable candidates. The control pattern evaluation unit 122 compares the control patterns, having average processing time less than the service level, one to another, and selects the control pattern having the least consumption of resources.

For example, if the service level is set at 50 (seconds), as shown in FIG. 22, both of the control patterns of FIG. 21 may be said to satisfy the service level. Thus, the control pattern evaluation unit 122 compares the result of the simulation shown in FIG. 21 to select the control pattern of the control pattern ID of 'pattern1' having the least quantity of consumption of resources.

FIG. 23 shows an example of the information on the control patterns already evaluated. The information is stored in the evaluated control patterns has been stored in the evaluated control pattern memory 125. The control pattern exercising unit 123 takes out the information on the control pattern, which is the control pattern already evaluated, from the control pattern memory 101, and issues a control command to the virtual server resource management unit 301 and the virtual network resource management unit 302 of the resource management unit 300. As a result, the virtual system, having resources allocated as shown in FIG. 8, now has resources allocated as shown in FIG. 15. The new post-change allocation of the resources has been selected based on the results of prediction by the simulation execution unit 121, and hence satisfies the service level required of the virtual system in question, as well as minimizing the quantity of consumption of resources.

Figure 24:
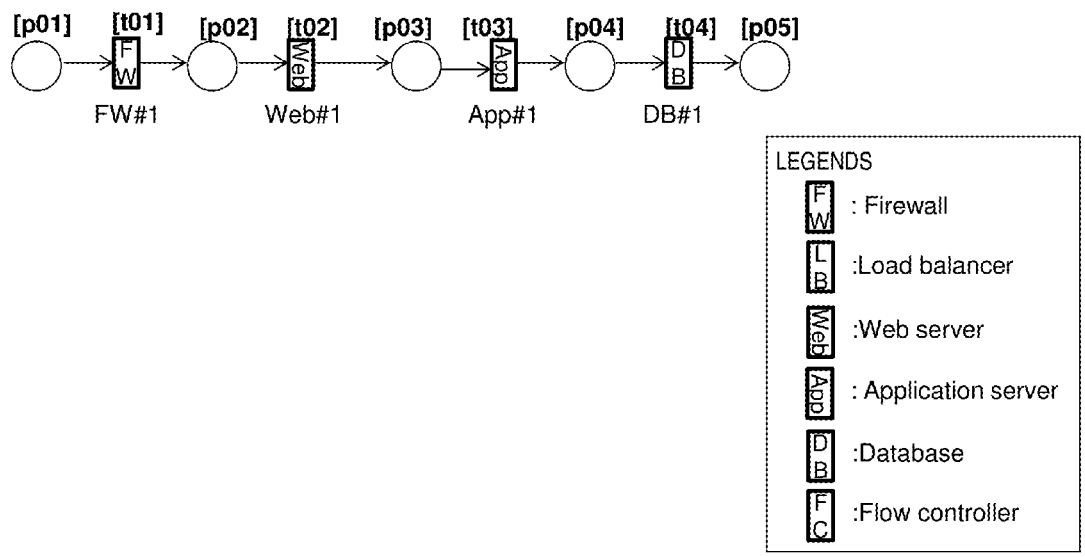
FIG. 24 is a graph showing another virtual system for illustrating the selection of control patterns.

Another example virtual system will now be explained in connection with selection of the control pattern. FIG. 24 depicts a directed bipartite graph showing a virtual system. FIG. 25 shows certain example resource allocation change policies applicable to the above virtual system. A candidate 1 is an example resource allocation change policy in which a load balancer and a clone Web server are added to a Web server in a virtual system. A candidate 2 is an example resource allocation change policy in which the performance of the Web server in a virtual system is reinforced. A candidate 3 is an example resource allocation change policy in which a flow controller is arranged in a pre-stage of a Web server in a virtual system and in which limitations are imposed on the number of connections.

An upper part of FIG. 26 shows the results of service level prediction by the simulation execution unit 121 for cases where a control pattern generated with the use of each one of the above candidates is applied. If, for example, the service level is set at 5 (seconds), the candidate 3 is a control pattern that is not down to the service level, and hence is exempted from use as the control pattern. The control pattern evaluation unit 122 then compares the candidates 1 and 2 to each other to select the candidate 2 with the lesser quantity of consumption of resources. As a result, the allocation of resources to the virtual system shown in FIG. 24 is changed over to that in which the Web server performance has been reinforced, as shown in a lower part of FIG. 26.

Although a preferred exemplary embodiment of the present invention has been described above, the present invention is not to be restricted to this particular mode, such that further changes, substitutions or adjustments may be made within the range not departing from the basic technical concept of the invention. For example, there is no limitation to the network configuration or the number of elements used in the above described exemplary embodiment.

Also, in the above described exemplary embodiment, it has been set out that such a control pattern with the least quantity of the consumption of resources is to be selected out of the control patterns satisfying the service level. However, the control pattern may also be selected with the use of some other standard or reference. For example, even if a control pattern has the least quantity of the consumption of resources, but the service level predicted of the control pattern is extremely close to the required service level, such control pattern may not be selected. By so doing, it is possible to select such control pattern that is able to satisfy the service level even though the number of request has increased beyond the latest monitoring value.

It is also to possible select a control pattern as either the server resources or the network resources are prioritized in consideration of the redundant capacity of the overall system. For example, if there are two control patterns that will increase the quantity of consumption of resources by "2", and the server resources are higher in tolerability or allowance, such a control pattern selection standard or reference that selects the control pattern that will increase the server resources by "2" may be used. In addition, when there are a control pattern that will increase the quantity of consumption of resources by "3" and a control pattern that will increase the quantity of consumption of resources by "2", such a control pattern selection standard or reference may be used in which the control pattern that has a greater quantity of consumption of resources but that will not increase the quantity of consumption of network resources is selected.

In the above described exemplary embodiment, it has been stated that the latest monitoring information is used as input values to carry out the simulation. It is also possible to use statistics information or a variety of correction values to carry out simulation to higher precision.

Also, in the above described exemplary embodiment, such a resource allocation change policy is used in which allocation of resources is changed in an increasing direction. It is however also possible to use a resource allocation change policy in which allocation of resources is changed in a decreasing direction. In such case, the graph shown on the right side of FIG. 12 is a pattern of application and the graph shown on the left side of FIG. 12 is a resource allocation change policy. In this case, the quantity of consumption of resources will have a negative value.

Finally, certain referred modes of the present invention will be summarized.

[Mode 1]
(Reference is made to the system for controlling the resources according to the first aspect).

[Mode 2]
The system for controlling the resources according to mode 1, wherein,
the control pattern generation unit generates a plurality of control patterns for each of the virtual systems of the virtual datacenters co-residing on a cloud platform;
the control unit selects the control pattern(s) for the virtual system(s) of each virtual datacenter and putting the control pattern(s) to use.

[Mode 3]
The system for controlling the resources according to mode 1 or 2, wherein,
the preset standard or reference for selection is such a one that selects, from among a plurality of the control patterns satisfying the service level, such a control pattern having a lesser quantity of consumption of resources.

[Mode 4]
The system for controlling the resources according to any one of modes 1 to 3, wherein,
the preset standard or reference for selection is such a one that selects, from among a plurality of the control patterns satisfying the service level, such a control pattern having a lesser quantity of consumption of resources of the server resources or the network resources, whichever are higher in the priority level.

[Mode 5]
The system for controlling the resources according to any one of modes 1 to 4, wherein,
the control pattern generation unit includes
a prediction equation generation unit that generates, for each of the network element(s) and the server(s) of the virtual system(s), operating on the virtual datacenter(s), an equation of prediction for predicting the processing time for the case of having changed the resources allocated based on the quantity of resources already allocated and on the results of measurement of processing time for the case of using the quantity of resources already allocated;
a virtual system model generation unit that generates the virtual system model(s) using the construction information of the virtual system(s) operating on the virtual datacenter(s) and also using the equation of prediction generated by the prediction equation generation unit; and
a control pattern derivation unit that synthesizes a configuration included in the virtual system model generated by the virtual system model generation unit and the resource allocation change policy applicable together so as to form the control pattern.

[Mode 6]
The system for controlling the resources according to any one of modes 1 to 5, wherein,
the control unit includes
a simulation execution unit that executes simulation of predicting a service level using the plurality of the control patterns;
a control pattern evaluation unit that selects, based on the result of the simulation, such control pattern that satisfies the service level of the virtual system as well as satisfying the preset standard or reference; and
a control pattern applying unit that changes the allocation of the network resources and the server resources in accordance with the selected control pattern.

[Mode 7]
The system for controlling the resources according to any one of modes 1 to 6, wherein,
a resource allocation change policy or policies for carrying out path control and flow control is among the resource allocation change policies.

[Mode 8]
(Reference is made to the apparatus for generating a control pattern according to the second aspect).

[Mode 9]
(Reference is made to the control apparatus according to the third aspect).

[Mode 10]
(Reference is made to the method for controlling resources according to the fourth aspect).

[Mode 11]
(Reference is made to the program according to the fifth aspect).

It should be noted that the modes 8 to the mode 11 may be expanded to the modes 2 to 7 as is the mode 1.

The disclosures of the above mentioned Patent Literatures and Non-Patent Literatures are to be incorporated herein by reference. The exemplary embodiments or Examples may be modified or adjusted within the concept of the total disclosures of the present invention, inclusive of claims, based on the fundamental technical concept of the invention. A series of combinations or selections of elements herein disclosed (elements of claims, Examples and drawings) may be made within the context of the claims of the present invention. That is, the present invention may include a wide variety of changes or corrections that may occur to those skilled in the art in accordance with the total disclosures inclusive of the claims and the drawings as well as the technical concept of the invention. In particular, it should be understood that any optional numerical figures or sub-ranges contained in the ranges of numerical values set out herein ought to be construed to be specifically stated even in the absence of explicit statements.

The invention claimed is:

1. A system for controlling resources comprising:
   a control pattern generation unit that generates a plurality of control patterns from virtual system model(s), produced by modeling the behaviors of network element(s) and server(s) of virtual system(s) operating on virtual datacenter(s), and from a resource allocation change policy stipulating a policy or policies of change of allocation of resources to the virtual system(s), the plurality of control patterns proving candidates for control commands to network resources and server resources of the virtual system(s), wherein the control pattern generation unit includes:
      a prediction equation generation unit that generates, for each of the network element(s) and the server(s) of the virtual system(s), operating on the virtual datacenter(s), an equation of prediction for predicting the processing time for the case of having changed the resources allocated based on the quantity of resources already allocated and on the results of measurement of processing time for the case of using the quantity of resources already allocated;
      a virtual system model generation unit that generates the virtual system model(s) using the construction information of the virtual system(s) operating on the virtual datacenter(s) and also using the equation of prediction generated by the prediction equation generation unit; and
      a control pattern derivation unit that synthesizes a configuration included in the virtual system model(s) generated by the virtual system model generation unit and the resource allocation change policy applicable together so as to form the control pattern; and
   a control unit that carries out prediction of a service level, with the use of the plurality of control patterns, selecting, with the use of the result of prediction, such control pattern that satisfies the service level of the virtual system(s) and that also satisfies a preset standard or reference for selection, from among the plurality of control patterns, and putting the selected control pattern to use, wherein the control unit includes:
      a simulation execution unit that exercises simulation of predicting a service level using the plurality of the control patterns;
      a control pattern evaluation unit that selects, based on the result of the simulation, such control pattern that satisfies the service level of the virtual system as well as the preset standard or reference; and
      a control pattern applying unit that changes an allocation of the network resources and the server resources in accordance with the selected control pattern.

2. The system for controlling the resources according to claim 1, wherein,
   the control pattern generation unit generates the plurality of control patterns for each of the virtual system(s) of the virtual datacenter(s) co-residing on a cloud platform;
   the control unit selecting the control pattern(s) for the virtual system(s) of each virtual datacenter and putting the control pattern(s) to use.

3. The system for controlling the resources according to claim 1, wherein,
   the preset standard or reference for selection is such a one that selects, from among the plurality of the control patterns satisfying the service level, such a control pattern having a lesser quantity of consumption of resources.

4. The system for controlling the resources according to claim 1, wherein,
   the preset standard or reference for selection is such a one that selects, from among the plurality of the control patterns satisfying the service level, such a control pattern having a lesser quantity of consumption of resources of the server resources or the network resources, whichever are higher in the priority level.

5. The system for controlling the resources according to claim 1, wherein,
   a resource allocation change policy or policies for carrying out path control and flow control is among the resource allocation change policies.

6. A method for controlling resources comprising:
   (a) generating a plurality of control patterns from virtual system model(s), produced by modeling the behaviors of network element(s) and server(s) of virtual system(s) operating on virtual datacenter(s), the plurality of control patterns proving candidates for control commands to network resources and server resources of the virtual system(s), wherein generating the plurality of control patterns from the virtual system model(s) includes:
      generating, for each of the network element(s) and the server(s) of the virtual system(s), operating on the virtual datacenter(s), an equation of prediction for predicting the processing time for the case of having changed the resources allocated based on the quantity of resources already allocated and on the results of measurement of processing time for the case of using the quantity of resources already allocated;
      generating the virtual system model(s) using the construction information of the virtual system(s) operating on the virtual datacenter(s) and also using the generated equation of prediction; and
      synthesizing a configuration included in the generated virtual system model(s) and a resource allocation change policy stipulating a policy or policies of change of allocation of resources to the virtual system(s), so as to form the control pattern;
   (b) carrying out prediction of a service level, by exercising simulation using the plurality of control patterns;
   (c) selecting, with the use of the result of prediction, such control pattern that satisfies a service level of the virtual system(s) and that also satisfies a preset standard or reference for selection, from among the plurality of control patterns; and (d) putting the selected control pattern to use by changing an allocation of the network resources and the server resources in accordance with the selected control pattern.

7. The method of claim 6, further comprising:
generating the plurality of control patterns for each of the virtual system(s) of the virtual datacenter(s) co-residing on a cloud platform; and
selecting the control pattern(s) for the virtual system(s) of each virtual datacenter and putting the control pattern(s) to use.

8. The method of claim 6, wherein the preset standard or reference for selection is such a one that selects, from among the plurality of the control patterns satisfying the service level, such a control pattern having a lesser quantity of consumption of resources.

9. The method of claim 6, wherein the preset standard or reference for selection is such a one that selects, from among the plurality of the control patterns satisfying the service level, such a control pattern having a lesser quantity of consumption of resources of the server resources or the network resources, whichever are higher in the priority level.

10. The method of claim 6, wherein a resource allocation change policy or policies for carrying out path control and flow control is among the resource allocation change policies.

11. A non-transitory computer-readable recording medium storing thereon a program that causes a computer, making up a system for controlling the resources, to perform a processing of:
(a) generating a plurality of control patterns from virtual system model(s), produced by modeling the behaviors of network element(s) and server(s) of virtual system(s) operating on virtual datacenter(s), the plurality of control patterns proving candidates for control commands to network resources and server resources of the virtual system(s), wherein generating the plurality of control patterns from the virtual system model(s) includes:
generating, for each of the network element(s) and the server(s) of the virtual system(s), operating on the virtual datacenter(s), an equation of prediction for predicting the processing time for the case of having changed the resources allocated based on the quantity of resources already allocated and on the results of measurement of processing time for the case of using the quantity of resources already allocated;
generating the virtual system model(s) using the construction information of the virtual system(s) operating on the virtual datacenter(s) and also using the generated equation of prediction; and
synthesizing a configuration included in the generated virtual system model(s) and a resource allocation change policy stipulating a policy or policies of change of allocation of resources to the virtual system(s), so as to form the control pattern;
(b) carrying out prediction of a service level, by exercising simulation using the plurality of control patterns;
(c) selecting, with the use of the result of prediction, such control pattern that satisfies a service level of the virtual system(s) and that also satisfies a preset standard or reference for selection, from among the plurality of control patterns; and
(d) putting the selected control pattern to use by changing an allocation of the network resources and the server resources in accordance with the selected control pattern.

12. The non-transitory computer-readable recording medium of claim 11, wherein the program further causes the computer to perform a processing of:
generating the plurality of control patterns for each of the virtual system(s) of the virtual datacenter(s) co-residing on a cloud platform; and
selecting the control pattern(s) for the virtual system(s) of each virtual datacenter and putting the control pattern(s) to use.

13. The non-transitory computer-readable recording medium of claim 11, wherein the preset standard or reference for selection is such a one that selects, from among the plurality of the control patterns satisfying the service level, such a control pattern having a lesser quantity of consumption of resources.

14. The non-transitory computer-readable recording medium of claim 11, wherein the preset standard or reference for selection is such a one that selects, from among the plurality of the control patterns satisfying the service level, such a control pattern having a lesser quantity of consumption of resources of the server resources or the network resources, whichever are higher in the priority level.

15. The non-transitory computer-readable recording medium of claim 11, wherein a resource allocation change policy or policies for carrying out path control and flow control is among the resource allocation change policies.

16. A system for controlling resources comprising:
one or more processors; and
one or more memories storing program(s) that causes the one or more processors to perform a processing of:
(a) generating a plurality of control patterns from virtual system model(s), produced by modeling the behaviors of network element(s) and server(s) of virtual system(s) operating on virtual datacenter(s), the plurality of control patterns proving candidates for control commands to network resources and server resources of the virtual system(s), wherein generating the plurality of control patterns from the virtual system model(s) includes:
generating, for each of the network element(s) and the server(s) of the virtual system(s), operating on the virtual datacenter(s), an equation of prediction for predicting the processing time for the case of having changed the resources allocated based on the quantity of resources already allocated and on the results of measurement of processing time for the case of using the quantity of resources already allocated;
generating the virtual system model(s) using the construction information of the virtual system(s) operating on the virtual datacenter(s) and also using the generated equation of prediction; and
synthesizing a configuration included in the generated virtual system model(s) and a resource allocation change policy stipulating a policy or policies of change of allocation of resources to the virtual system(s), so as to form the control pattern;
(b) carrying out prediction of a service level, by exercising simulation using the plurality of control patterns;
(c) selecting, with the use of the result of prediction, such control pattern that satisfies a service level of the virtual system(s) and that also satisfies a preset standard or reference for selection, from among the plurality of control patterns; and
(d) putting the selected control pattern to use by changing an allocation of the network resources and the server resources in accordance with the selected control pattern.

17. The system of claim 16, wherein the program(s) further causes the one or more processors to perform a processing of:
- generating the plurality of control patterns for each of the virtual system(s) of the virtual datacenter(s) co-residing on a cloud platform; and
- selecting the control pattern(s) for the virtual system(s) of each virtual datacenter and putting the control pattern(s) to use.

18. The system of claim 16, wherein the preset standard or reference for selection is such a one that selects, from among the plurality of the control patterns satisfying the service level, such a control pattern having a lesser quantity of consumption of resources.

19. The system of claim 16, wherein the preset standard or reference for selection is such a one that selects, from among the plurality of the control patterns satisfying the service level, such a control pattern having a lesser quantity of consumption of resources of the server resources or the network resources, whichever are higher in the priority level.

20. The system of claim 16, wherein a resource allocation change policy or policies for carrying out path control and flow control is among the resource allocation change policies.

* * * * *